(12) United States Patent
Sasaki et al.

(10) Patent No.: US 8,073,923 B2
(45) Date of Patent: Dec. 6, 2011

(54) WIRELESS NETWORK SYSTEM AND WIRELESS COMMUNICATION PROGRAM

(75) Inventors: Tetsuya Sasaki, Kyoto (JP); Masato Kuwahara, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1606 days.

(21) Appl. No.: 11/066,128

(22) Filed: Feb. 28, 2005

(65) Prior Publication Data

US 2006/0106963 A1    May 18, 2006

(30) Foreign Application Priority Data

Nov. 18, 2004 (JP) ................ 2004-334536

(51) Int. Cl.
*G06F 15/16* (2006.01)
(52) U.S. Cl. ............................... 709/209
(58) Field of Classification Search .............. 709/209
See application file for complete search history.

(56) References Cited

U.S. PATENT DOCUMENTS

| | | | | |
|---|---|---|---|---|
| 4,546,351 | A | * | 10/1985 | Nambu ............ 709/209 |
| 5,461,608 | A | * | 10/1995 | Yoshiyama ............ 370/222 |
| 6,879,570 | B1 | | 4/2005 | Choi |
| 7,177,911 | B2 | * | 2/2007 | deCarmo ............ 709/209 |
| 2001/0012757 | A1 | | 8/2001 | Boyle |
| 2001/0029166 | A1 | | 10/2001 | Rune et al. |
| 2003/0124979 | A1 | * | 7/2003 | Tanada et al. ............ 455/41 |

FOREIGN PATENT DOCUMENTS

| | | |
|---|---|---|
| JP | 2867980 | 12/1998 |
| JP | 2924828 | 5/1999 |
| JP | 11-355867 | 12/1999 |
| JP | A-H11-355867 | 12/1999 |
| JP | 3421017 | 4/2003 |
| JP | 2004-80400 | 3/2004 |
| JP | A-2004-80400 | 3/2004 |

* cited by examiner

*Primary Examiner* — Jeffrey Pwu
*Assistant Examiner* — Shripal Khajuria
(74) *Attorney, Agent, or Firm* — Nixon & Vanderhye P.C.

(57) ABSTRACT

Upon receipt of a network connection request, a CPU core of a game device randomly sets a master device search period, and searches for a master device or a temporary master device until the master device search period ends. When the master device search period ends, the CPU core randomly sets a temporary master process period, and causes the game device to act as a temporary master until the temporary master process period ends. The CPU core alternately repeats the master device search and the temporary master process. The game device is caused to act as a slave device if any game device acting as the master device or temporary master device is found during the master device search period. Alternatively, the game device is caused to act as a master device if a connection request from another game device is received during the temporary master process period. Thus, it is possible to automatically construct a wireless network with one master device and one or more slave devices.

24 Claims, 24 Drawing Sheets

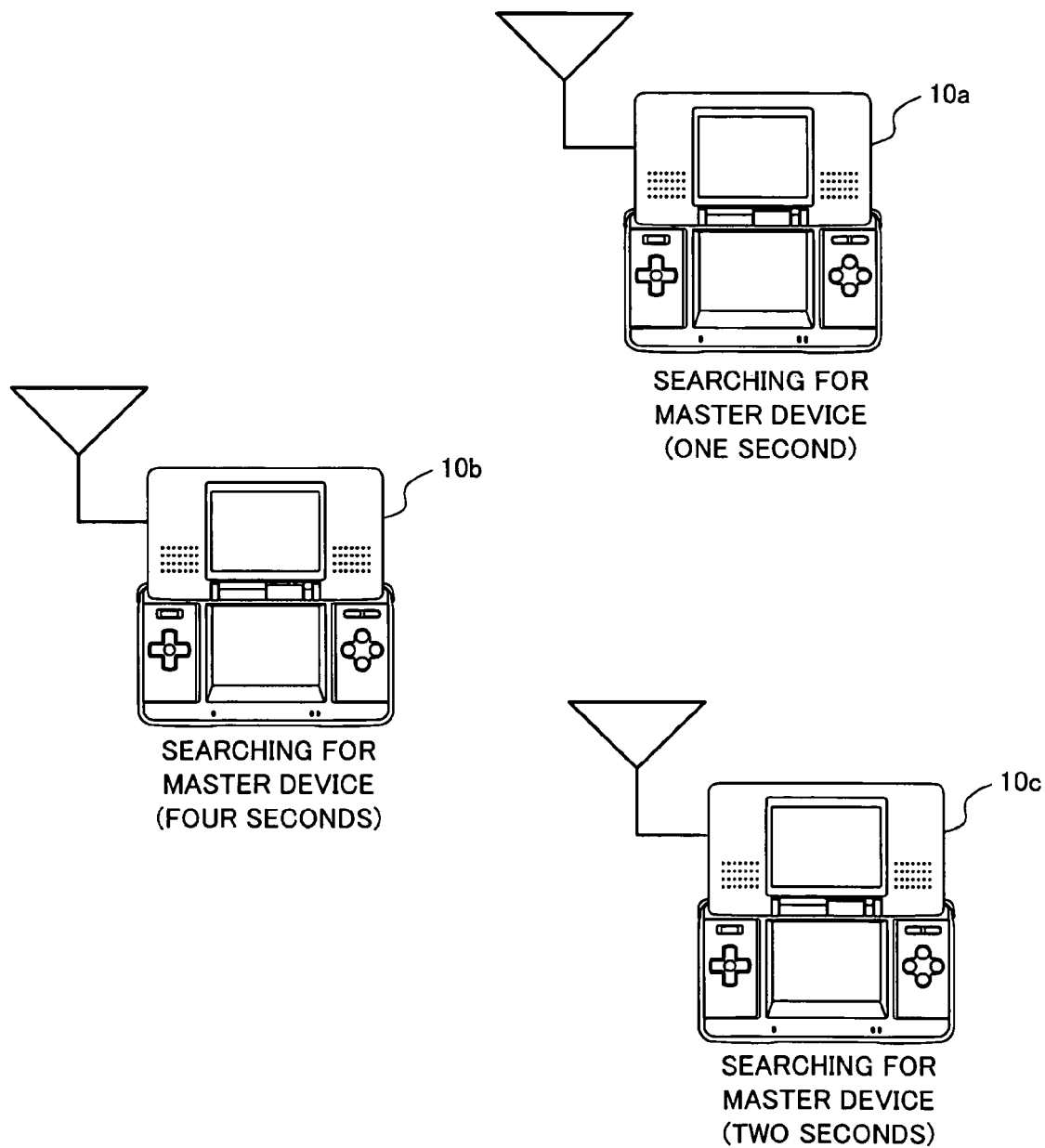

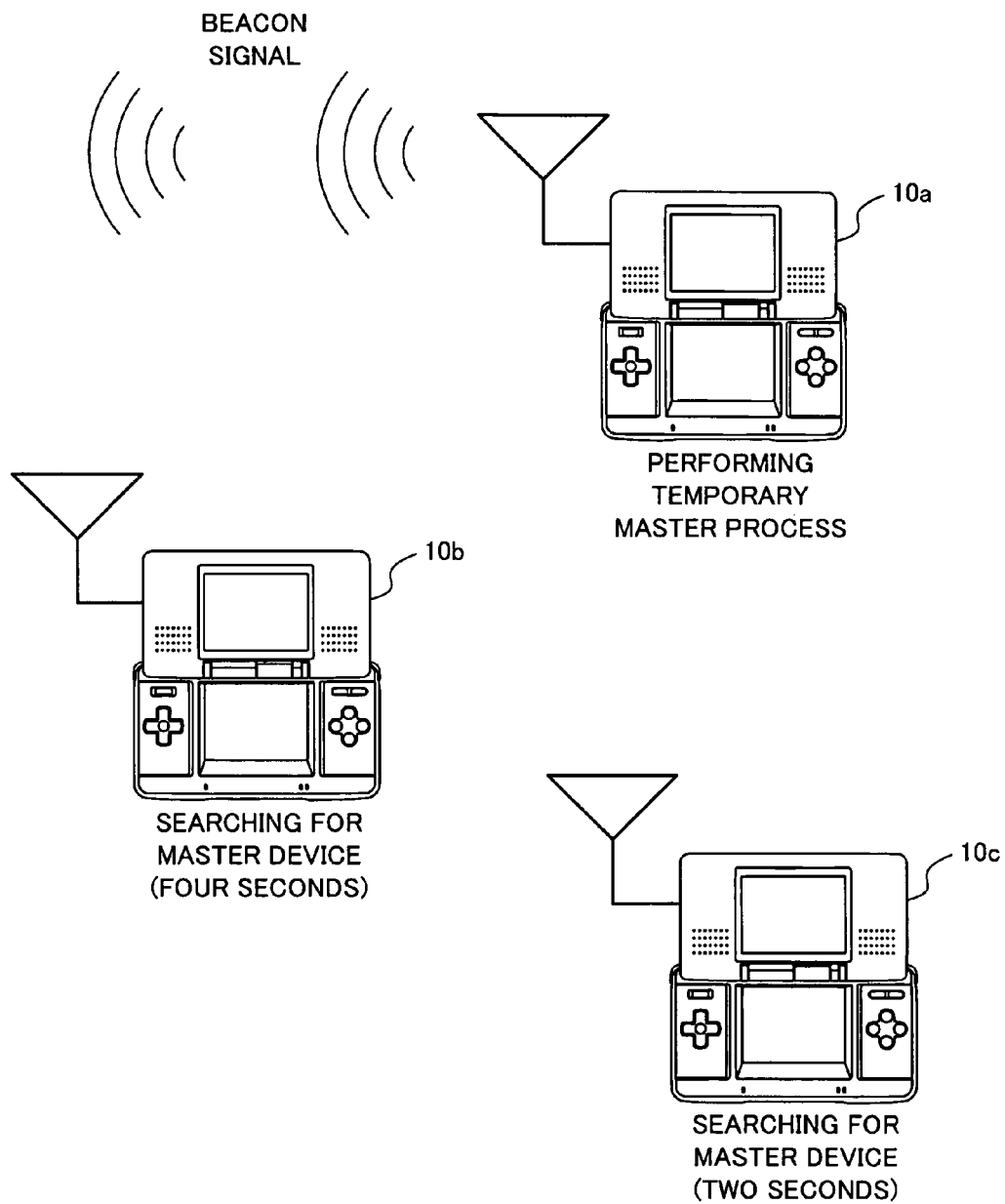

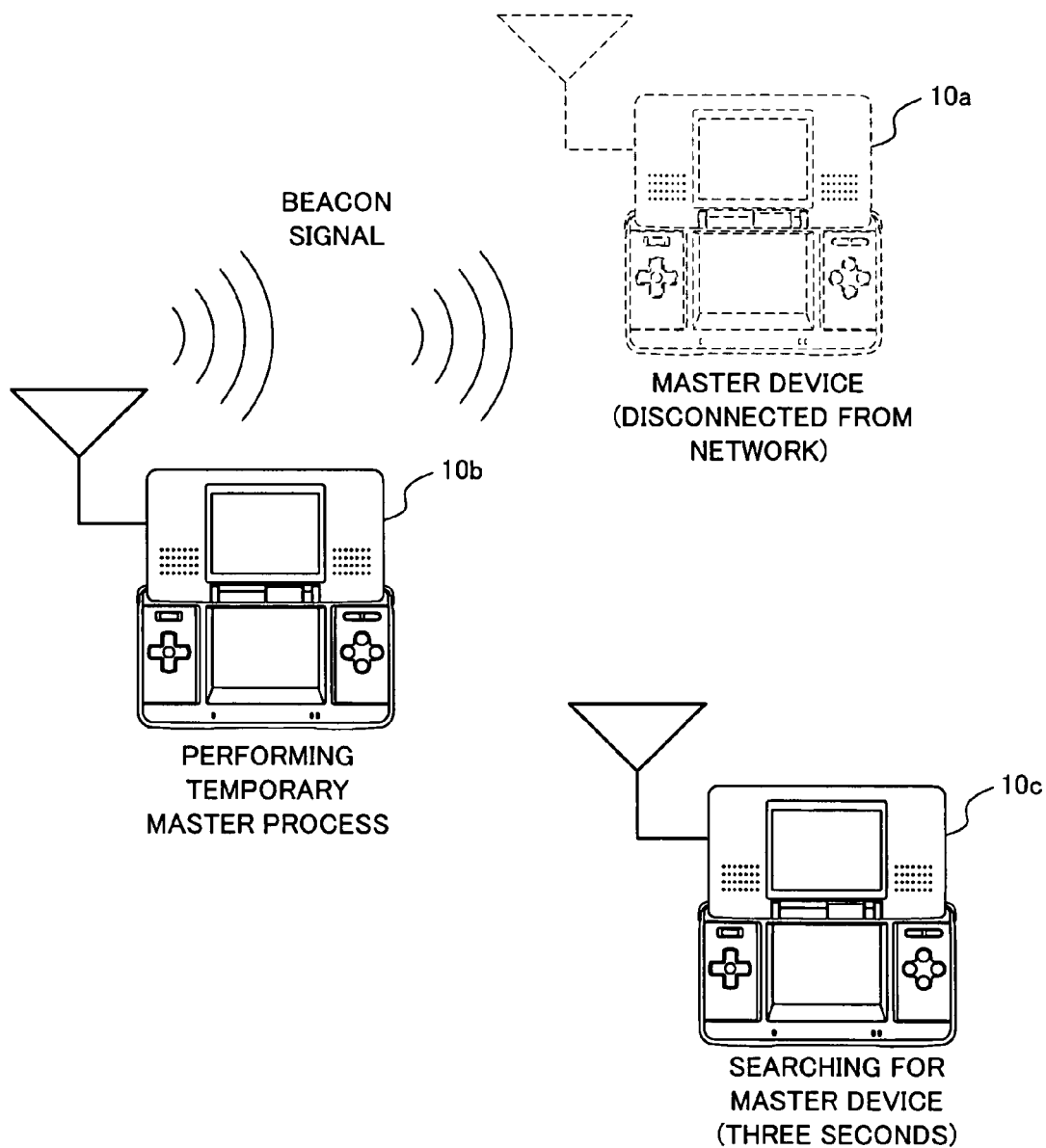

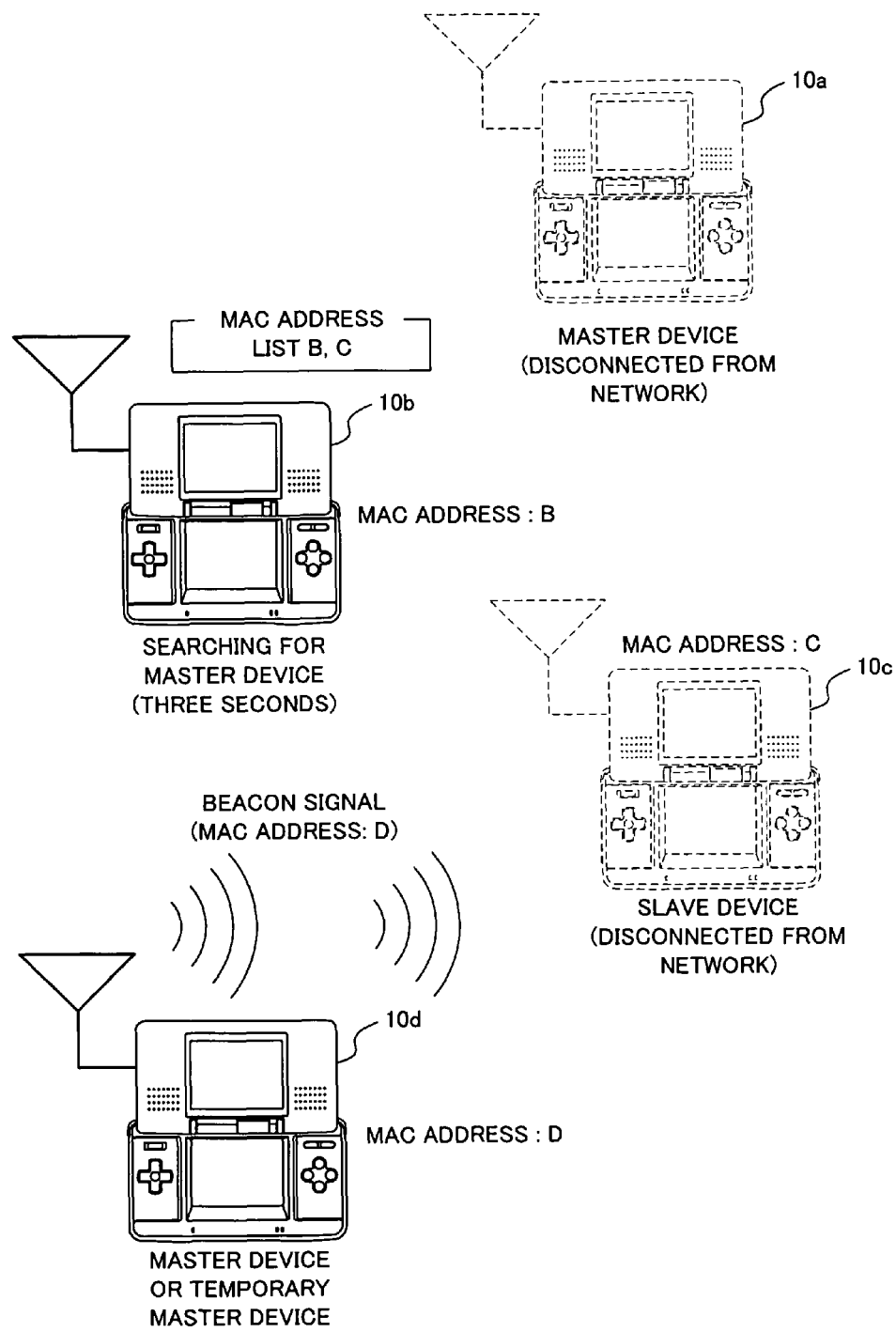

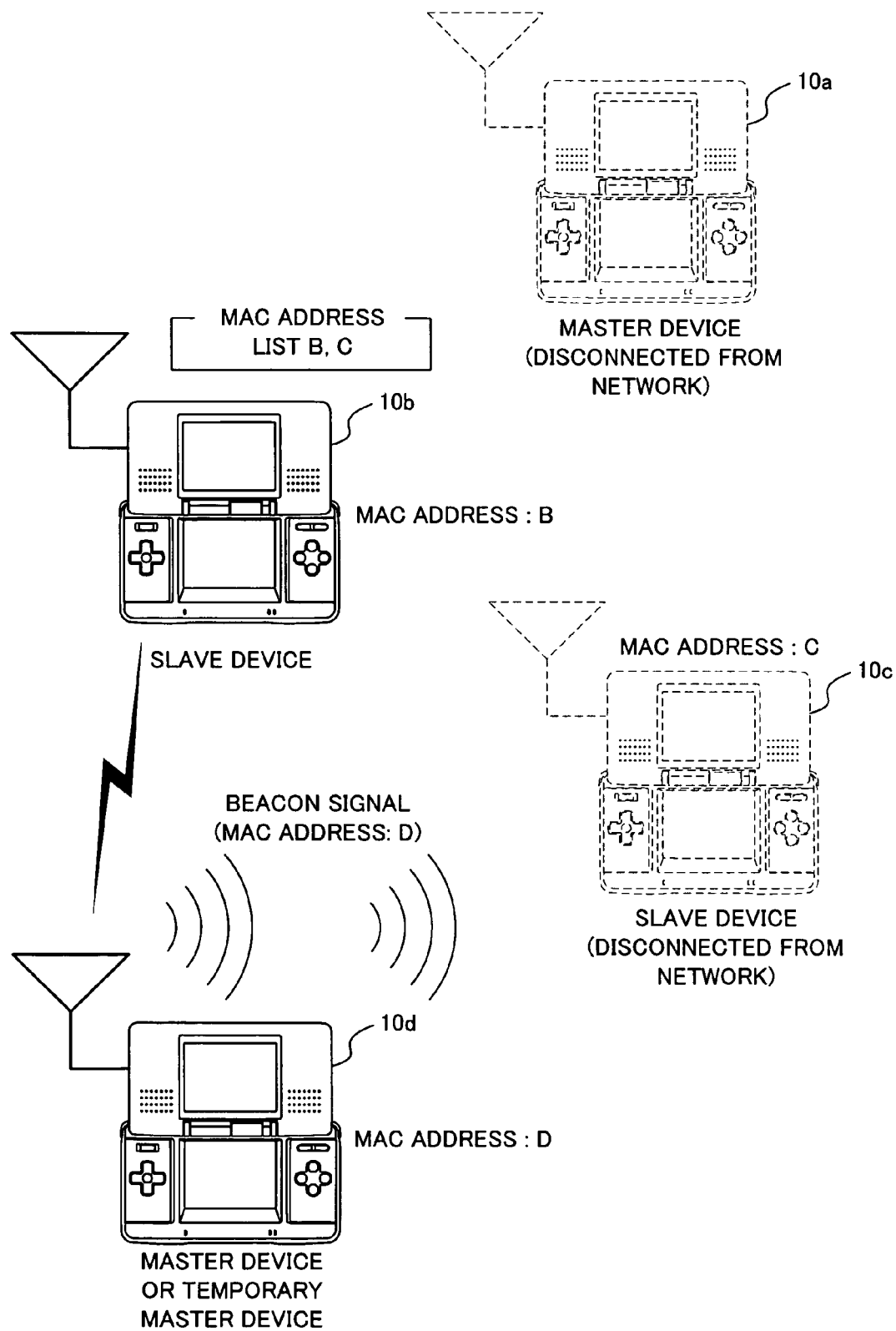

FIG. 11

| MAC ADDRESS ORDER | INITIAL MASTER DEVICE SEARCH PERIOD [MILLISECOND] |
|---|---|
| FIRST | 1000 |
| SECOND | 1700 |
| THIRD | 2400 |
| ... | ... |
| n'TH | 1000 + 700 * (n−1) |
| ... | ... |
| FIFTEENTH | 10800 |

WIRELESS NETWORK SYSTEM AND WIRELESS COMMUNICATION PROGRAM

TECHNICAL FIELD

The exemplary illustrative embodiments herein to a wireless network system and a wireless communication program, and more particularly, the exemplary illustrative embodiments herein relate to a wireless network system and a wireless communication program which, for example, when constructing a network constituted by master and slave devices, allow a master device to be selected from among terminal devices for use in constructing the network, thereby eliminating the necessity of previously determining the master device.

BACKGROUND AND SUMMARY

In conventional network systems, especially when playing games, it is often the case that, a server is previously set as a master device for controlling communications. A network configured in such a manner ceases to function if the master device is disconnected therefrom, so that a game player is forced to stop game play. Also, wireless communication network systems are widely used because of their well-known high degree of connection/disconnection flexibility. Note that the "disconnection of a device from a network" as described herein occurs, for example, when power of the device has been suddenly shut down, when the device has moved to a location where no radio waves from the network reach the device, when the device has logged off of the network, when any error has occurred with the device, when the device has frozen, and so on.

In the technology disclosed by Japanese Patent No. 2867980, one candidate wireless communication terminal device for use in constructing a network acts as a temporary master, and collects data concerning the latest received field intensity at the time from other candidate wireless communication terminal devices for use in constructing the network. Then, another terminal device is assigned as the temporary master to collect data concerning the latest received field intensity at the time from other candidate wireless communication terminal devices for use in constructing the network. Thereafter, based on the results of the collection, a candidate for a master device is selected from among all the candidate wireless communication terminal devices for use in constructing the network such that the received field intensity is satisfactory to all the terminal devices.

In the technology disclosed by Japanese Patent No. 2924828, one candidate wireless communication terminal device for use in constructing a network acts as a temporary master, and collects information concerning the amount of remaining power and data transfer rate from other candidate wireless communication terminal devices for use in constructing the network. Based on the results of collection, the temporary master determines, as a master device, a candidate wireless communication terminal device whose transfer rate is the highest among other candidate wireless communication terminal devices and whose remaining power is equal to or more than a predetermined value.

In the technology disclosed by Japanese Patent No. 3421017, if a network is constructed by a master device (network master) and a plurality of slave devices, the order of priority for assigning the role of a backup master to the slave devices is determined, and information concerning the priority order is shared between all the slave devices. If the master device (network master) is disconnected from the network, each terminal device having acted as a slave device sequentially attempts to connect to terminal devices, which have a higher priority as a backup master in descending order of priority among the terminal devices, so as to connect to a network in which the first device to which the terminal device is successfully connected acts as a network master. Alternatively, if the terminal device recognizes that there is no terminal device having a higher priority as a backup master within the range where communication is possible, then the terminal device behaves as a network master and waits for a connection request from a terminal device having a lower priority as a backup master.

According to the first reference, however, in order to determine a master device, it is required that a plurality of wireless communication terminal devices sequentially act as a temporary master for collecting data from all other terminal devices, and therefore time in accordance with the number of terminal devices is required for constructing a network.

Also, it is conceivable that, in a network game system based on the premise that, for example, game players with hand-held game devices having a radio communication function gather and play games together within such a range that they can see each other's faces, the received field intensity of each hand-held game device is satisfactory even if any hand-held game device acts as a master device. Accordingly, an excessive processing load is caused by collecting information concerning the received field intensity in a manner as disclosed in the first reference.

Also, it is conceivable that in a network game system, which is supposed to be comprised of a plurality of hand-held games of the same type, for example, the hand-held game devices are substantially identical in data transfer rate. Accordingly, an excessive processing load is caused by collecting information concerning the data transfer rate in a manner as disclosed in the second reference.

Further, neither of the first two references disclose how to deal with a situation where the master device is disconnected from a network in midstream.

In the technology disclosed in the third reference, when the master device is disconnected from a network, a slave device is set as a new master device based only on a predetermined order of priority. Accordingly, the degree of freedom in selecting a slave device as a candidate for a master device is low. Also, no description is given about a process to be performed when a master device is disconnected from a network constituted by two devices, i.e., the master device and a slave device.

Therefore, a feature of an exemplary illustrative embodiment is to provide a wireless network system where, when a plurality of terminal devices having a radio communication function are started, master and slave devices are automatically selected from among the terminal devices without causing users to set the master and slave devices.

Another feature of an exemplary illustrative embodiment is to provide a network system which allows master and slave devices to be set through a relatively simple and lightweight process.

Still another feature of an exemplary illustrative embodiment is to provide a network system with a high degree of freedom in selecting a new master device for use in constructing a new network when a previous master device has been disconnected.

Still another feature of an exemplary illustrative embodiment is to provide a network system which allows a master device to be determined more reliably to reconstruct a network.

Still another feature of an exemplary illustrative embodiment is to provide a network system which allows a network to be reconstructed with slave devices which had previously comprised the network together with a master device, the master device having been disconnected from the network.

Still another feature of an exemplary illustrative embodiment is to provide a network system which allows a slave device to connect to a master device in another network if a network to which the slave device has previously belonged cannot be reconstructed with any other slave device previously belonging to the same network.

The exemplary illustrative embodiments have the following aspects to attain the features mentioned above. The reference numerals or the like indicated between parentheses are merely provided to help in understanding the present invention in light of the exemplary illustrative embodiments to be described later, and are not to be taken as limiting.

A first aspect of an exemplary illustrative embodiment is directed to a wireless network system comprising a plurality of terminal device's (10) having a radio communication function, one of the plurality of terminal devices acting as a master device for controlling data transfer timing in a network, each terminal device other than the master device acting as a slave device performing data transfer with the master device under control of the master device.

Each of the plurality of terminal devices includes: a master device search section (21, 43); a temporary master process section (21, 44); a switching section (21, 45); a slave process section (21, 42); and a master process section (21, 41). The master device search section is operable to search for any other terminal device acting as the master device or a temporary master device. The temporary master process section is operable to cause the terminal device itself to act as the temporary master device. The switching section is operable to, if no network is constructed with any other terminal device, perform a switching operation for alternately activating the master device search section and the temporary master process section (see FIG. 4). The slave process section is operable to, if the master device search section detects the presence of the master device or temporary master device, cause the terminal device itself to act as a slave device for the detected master device or temporary master device. The master process section is operable to, if another terminal device is detected as searching for the master device or temporary master device during a period for which the terminal device itself is caused by the temporary master process section to act as the temporary master device, cause the terminal device itself to act as the master device.

Herein, the situation "where no network is constructed with any other terminal device" includes a situation immediately after the terminal device has been turned on and a situation immediately after a network has ceased to exist because a master device was disconnected from the network in which the terminal device belonged.

In a second aspect of an exemplary illustrative embodiment, based on the first aspect, the switching section performs the switching operation for alternately activating the master device search section and the temporary master process section, and the switching section randomly sets one or both of a period in which to activate the master device search section and a period in which to activate the temporary master process section.

In a third aspect of the an exemplary illustrative embodiment, based on the first aspect, each of the plurality of terminal devices transmits, at regular intervals, a beacon signal including at least information, which indicates that the terminal device itself is acting as the master device or temporary master device when acting as the master device or temporary master device respectively, and the master device search section receives a beacon signal transmitted from any other terminal device to detect the presence of the master device or temporary master device.

In a fourth aspect of the an exemplary illustrative embodiment, based on the first aspect, each of the plurality of terminal devices further includes a master device disconnection determination section (21, 47) for, when the terminal device itself is acting as the slave device, determining whether the master device is disconnected from a network in which the terminal device itself belongs, and if the master device disconnection determination section detects that the master device is disconnected from the network, the switching section automatically starts the switching operation.

Note that any known method can be employed for determining whether the master device is disconnected from the network. For example, it may be determined that the master device is disconnected from the network when a beacon signal transmitted from the master device has ceased to be received, or it may be determined that the master device is disconnected from the network when the slave device side has received a signal transmitted from the master device when disconnected from the network indicating the same.

In a fifth aspect of the an exemplary illustrative embodiment, based on the fourth aspect, each of the plurality of terminal devices further includes an identification information storage section (21, 48) for, when a network is constructed with any other terminal device, receiving and storing identification information for identifying that another terminal device is in the network, and the master device search section searches for any other terminal device, which is acting as the master device or temporary master device and has previously belonged in the network, based on the identification information stored in the identification information storage section.

In a sixth aspect of the an exemplary illustrative embodiment, based on the fifth aspect, after a predetermined period of time has elapsed since the master device disconnection determination section determined that the master device is disconnected from the network, the master device search section searches for, in addition to terminal devices having previously belonged in the network, a terminal device acting as the master device or temporary master device.

In a seventh aspect of an exemplary illustrative embodiment, based on the fifth aspect, the identification information is a MAC address list which lists a MAC address of any other terminal device having previously belonged in the network.

In an eighth aspect of an exemplary illustrative embodiment, based on the seventh aspect, each of the plurality of terminal devices transmits, at regular intervals, a beacon signal including at least its own MAC signal when acting as the master device or temporary master device, and when the presence of any other terminal device acting as the master device or temporary master device has been detected, the master device search section checks a MAC address of that other terminal device, which is included in the beacon signal transmitted from that other terminal device, with the MAC address list stored in the identification information storage section, and determines whether that other terminal device has previously belonged in the network in which the terminal device has previously belonged.

In a ninth aspect of an exemplary illustrative embodiment, based on the fourth aspect, each of the plurality of terminal devices further includes an individual number storage section (21, 48) for, when a network is constructed with any other terminal device, receiving and storing a list of an individual number of that other terminal device in the network, and when the master device disconnection determination section has determined that the master device is disconnected from the network, the switching section compares the individual number list stored in the individual number list with an individual number of the terminal device, and sets, based on a comparison result, an initial period in which to activate the master device search section.

In a tenth aspect of an exemplary illustrative embodiment, based on the ninth aspect, the individual number is a MAC address of a terminal device.

According to the first aspect, when constructing a completely new network or reconstructing a network having ceased to exist because a master device is disconnected therefrom, it is arbitrary as to which terminal device acts as a master device or a slave device. Thus, as compared to a case where a specific terminal device is always caused to act as a master device, it is possible to construct a wireless network comprised of one master device and one or more slave devices in a more flexible manner.

According to the second aspect, it is randomly determined which terminal device acts as a master device and which terminal device acts as a slave device. Thus, it is possible to prevent the processing load due to the operation as the master device from being concentrated on a specific terminal device.

According to the third aspect, by using a beacon signal generally used in a wireless network system, it is possible to detect the presence of the master device or temporary master device.

According to the fourth aspect, even if a network has ceased to exist because a master device is disconnected therefrom, the network can be automatically reconstructed.

According to the fifth aspect, even if a network has ceased to exist because a master device is disconnected therefrom, the network can be reconstructed by slave devices having previously belonged in the network.

According to the sixth aspect, when a network has ceased to exist because a master device is disconnected therefrom, even if it is not possible to reconstruct the network by slave devices having previously belonged in the network, it is possible to construct a new network with another terminal device located with the range where communication is possible. Thus, for example, even if a master device is disconnected from a network comprised of the master device and one slave device, a new network can be automatically constructed by the remaining slave device and any terminal device located within the range where communication is possible.

According to the seventh aspect, it is ensured that each terminal device can be identified by a MAC address.

According to the eighth aspect, by using a beacon signal generally used in a wireless network system, a terminal device can readily determine whether any other terminal device having transmitted the beacon signal has previously belonged in the same network as the terminal device.

According to the ninth aspect, when a master device is disconnected from a network, a period in which to start acting as a temporary master varies from one remaining slave device to another in accordance with their individual numbers. Thus, it is possible to prevent a plurality of slave devices from simultaneously starting to act as the temporary master.

According to the tenth aspect, when a master device is disconnected from a network, a period in which to start acting as a temporary master is determined based on a MAC address. Thus, it is ensured that the period in which to start acting as a temporary master varies from one remaining slave device to another.

BRIEF DESCRIPTION OF THE DRAWINGS

These and other features and advantages will be better and more completely understood by reference to the following detailed description of exemplary illustrative embodiments in conjunction with the drawings of which:

FIG. 7A is a diagram used for explaining the operation performed by each game device for constructing a network;

FIG. 7B is another diagram used for explaining the operation performed by each game device for constructing a network;

FIG. 8B is another diagram used for explaining the operation performed by each game device when a master device is disconnected from a network;

FIG. 10A is a diagram used for explaining a variation of the operation performed by each game device when a master device is disconnected from a network;

FIG. 10B is another diagram used for explaining a variation of the operation performed by each game device when a master device is disconnected from a network;

FIG. 11 is a table showing the correspondence between the MAC address order and the initial master device search period;

DETAILED DESCRIPTION

Hereinafter, the configuration and operation of a wireless network system according to an exemplary illustrative embodiment will be described.

Figure 1:
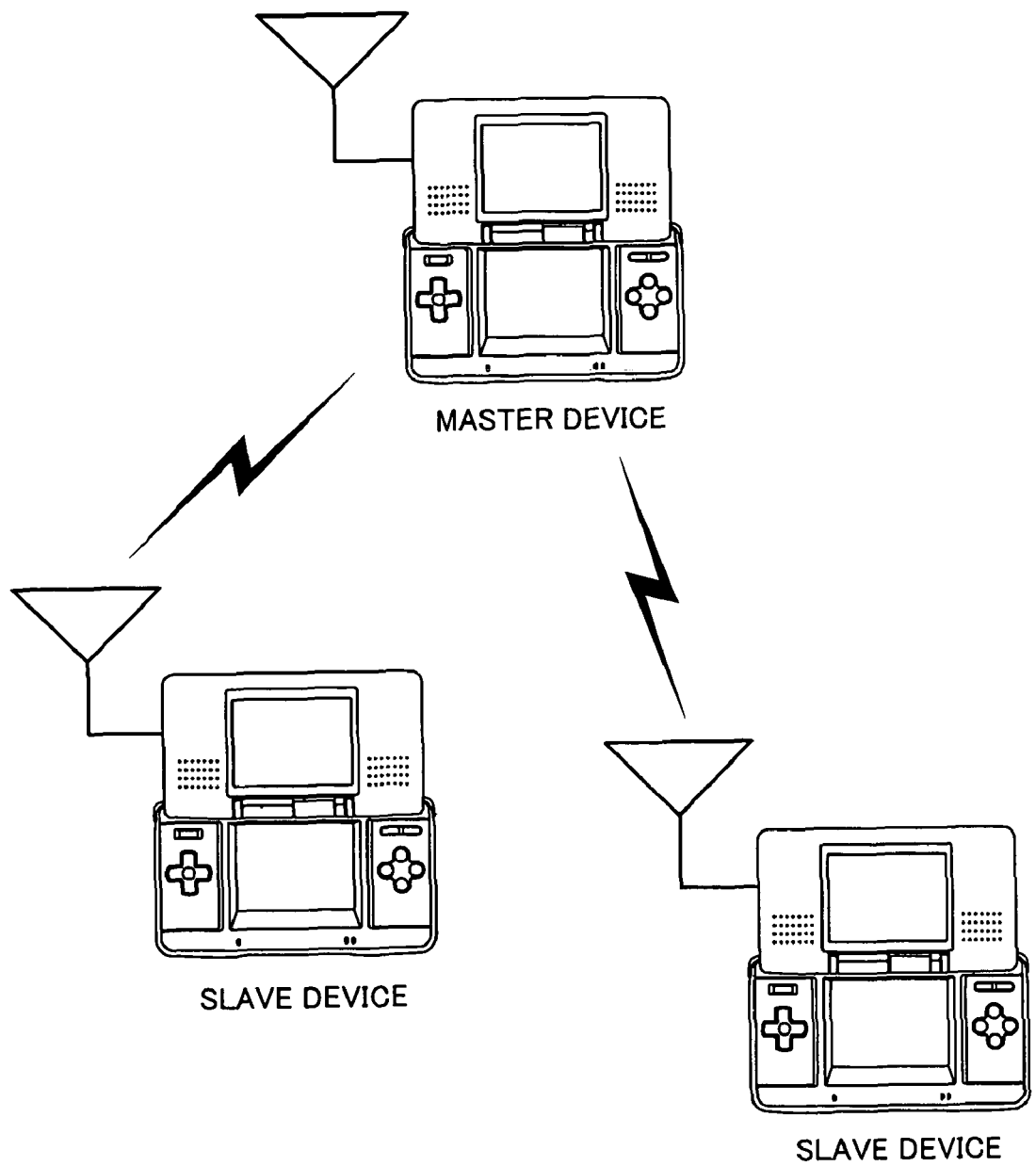
FIG. 1 is a diagram illustrating the overall configuration of a wireless network system according to an exemplary illustrative embodiment.

FIG. 1 illustrates the overall configuration of a wireless network system according to an exemplary illustrative embodiment. The wireless network system shown in FIG. 1 is comprised of three hand-held game devices having a radio communication function. One of the three game devices acts as a master device for controlling data transfer timing in the network, and the remaining two game devices act as slave devices (slave devices 1 and 2) which perform data transfer with the master device under the control of the master device. Note that in the example described herein, the wireless network system is comprised of the three game devices, but the present invention is not so limited. The wireless network system may be comprised of two game devices or four or more game devices. Also, the wireless network system may be comprised of any information processing terminal devices having a radio communication function, rather than hand-held game devices.

Figure 2:
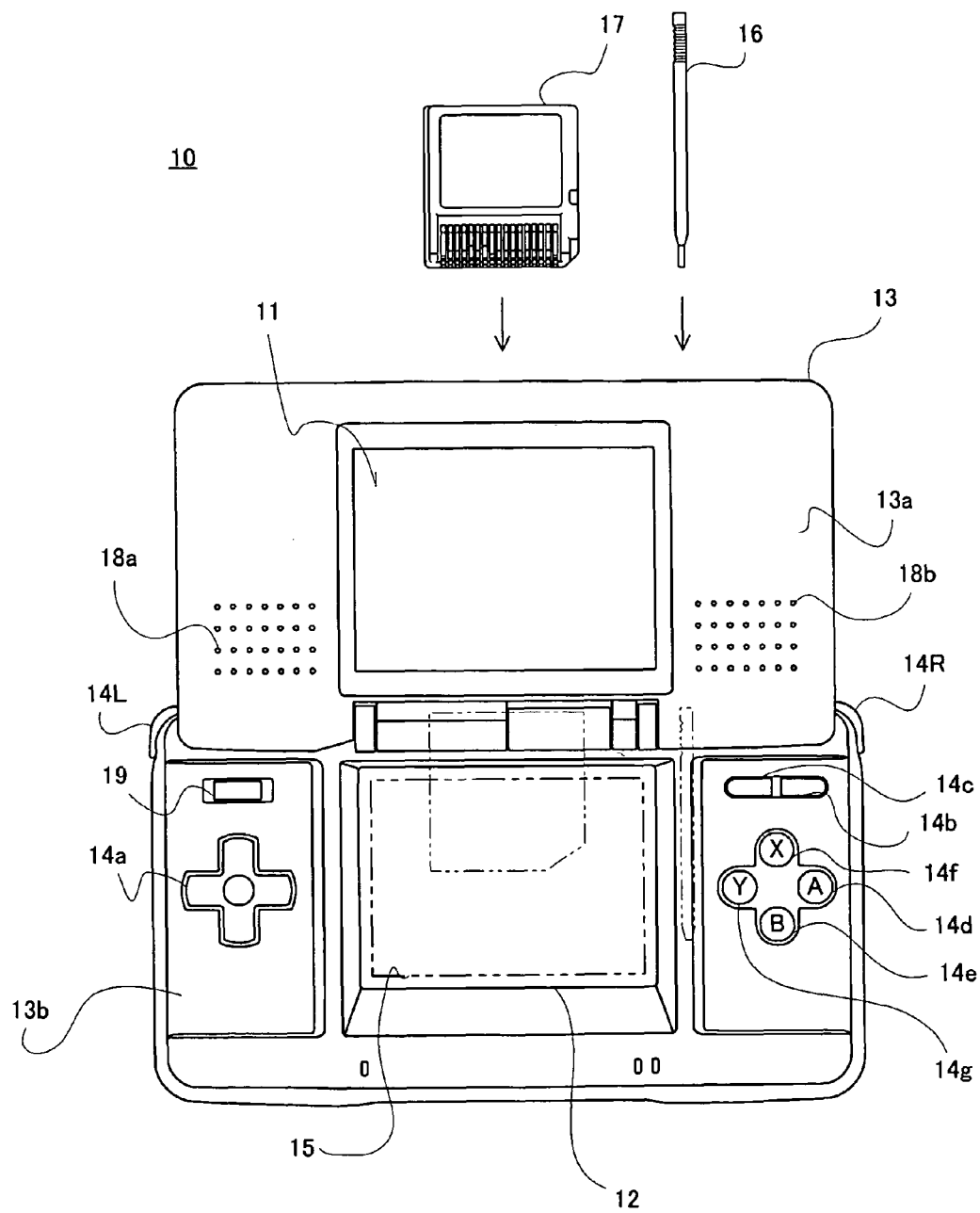
FIG. 2 is an external view of a game device included in a wireless network system.

FIG. 2 is an external view of a game device included in the wireless network system shown in FIG. 1. In FIG. 2, a game device 10 includes a first liquid crystal display (LCD) 11 and a second LCD 12. A housing 13 is comprised of an upper housing 13a and a lower housing 13b. The first LCD 11 is accommodated in the upper housing 13a, and the second LCD 12 is accommodated in the lower housing 13b. Each of the first and second LCDs 11 and 12 has a resolution of 256 dots×192 dots. Although an exemplary illustrative embodiment illustrates an example where LCDs are used as display devices, any other display devices, such as display devices using, for example, electroluminescence (EL) technology, can be used. Also, display devices of any level of resolution can be used.

The upper housing 13a has formed therein sound holes 18a and 18b for emitting sound from a pair of loudspeakers (30a and 30b in FIG. 3) which will be described later.

The lower housing 13b is provided with input devices, such as a cross switch 14a, a start switch 14b, a select switch 14c, an "A" button 14d, a "B" button 14e, an "X" button 14f, a "Y" button 14g, an "L" button 14L, and an "R" button 14R. Also, a further input device (touch panel 15) is mounted on the screen of the second LCD 12. Also, the lower housing 13b is provided with a power switch 19 and insertion slots for receiving a memory card 17 and a stick 16. The stick 16 is used for input operations on the touch panel 15.

The memory card 17 is a storage medium having stored therein a game program and a wireless communication program. The memory card 17 is removably loaded into an insertion slot provided in the lower housing 13b.

Next, the internal configuration of the game device 10 is described with reference to FIG. 3.

Figure 3:
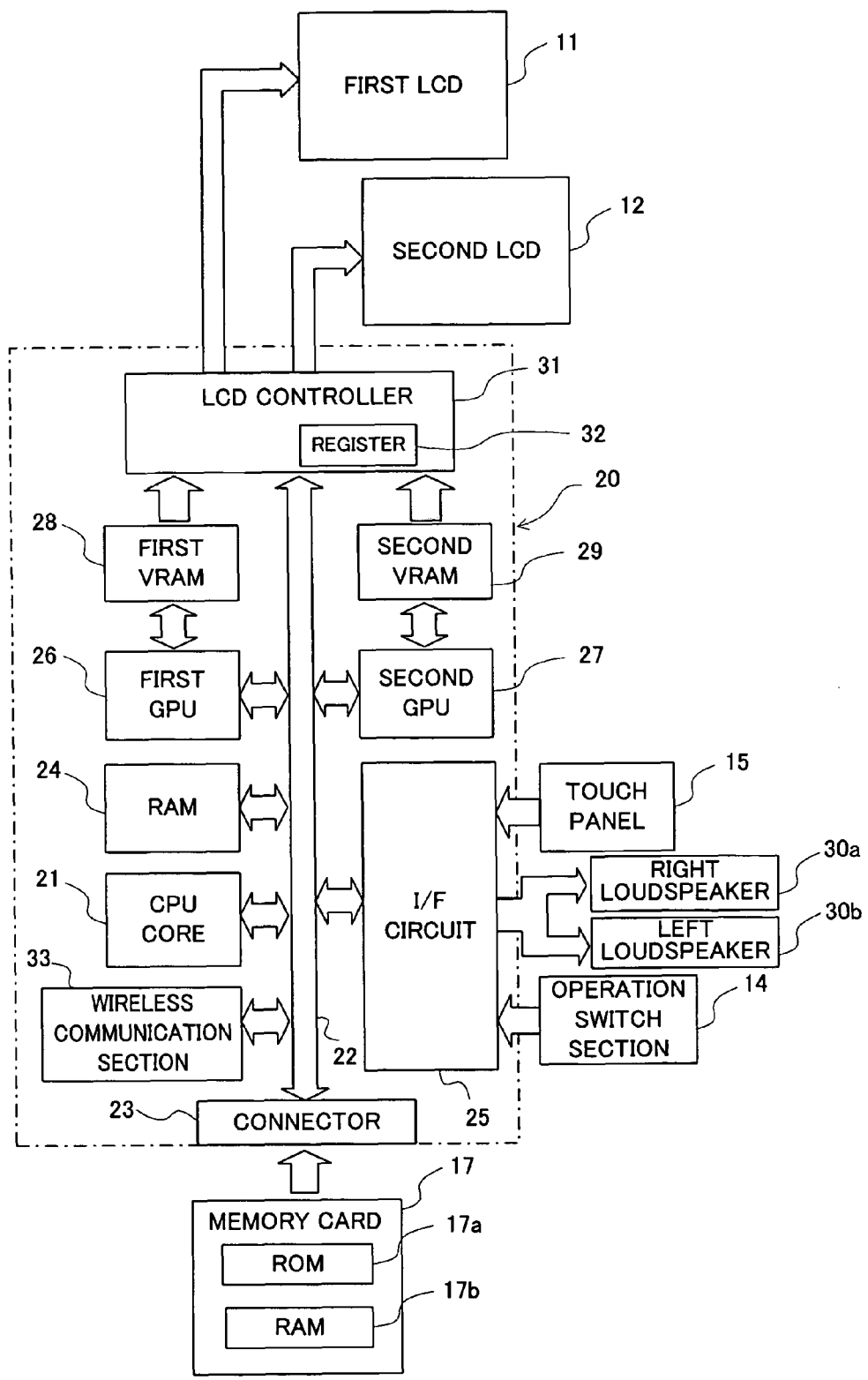
FIG. 3 is a diagram illustrating the internal configuration of a wireless network system.

In FIG. 3, a CPU core 21 is mounted on an electronic circuit board 20 which is accommodated in the housing 13. Via a bus 22, the CPU core 21 is connected to a connector 23, an input/output interface circuit (indicated as "I/F CIRCUIT" in FIG. 3) 25, a first graphics processing unit (GPU) 26, a second GPU 27, a RAM 24, an LCD controller 31, and a wireless communication section 33. The memory card 17 is detachably connected to the connector 23. The memory card 17 includes a ROM 17a, which has stored therein a game program and a wireless communication program, and a RAM 17b, which has backup data stored therein in a rewritable manner. The game program and the wireless communication program, which are stored in the ROM 17a of the memory card 17, are loaded onto the RAM 24, and executed by the CPU core 21. In addition to the game program and the wireless communication program, the RAM 24 stores temporary data, which is obtained by the CPU core 21 executing the game program, and data for generating a game image. The I/F circuit 25 is connected to the touch panel 15, a right loudspeaker 30a, a left loudspeaker 30b, and an operation switch section 14 shown in FIG. 2, which includes the cross switch 14a, the "A" button 14d, etc. The right loudspeaker 30a and the left loudspeaker 30b are placed inside the sound holes 18a and 18b.

Although an exemplary illustrative embodiment illustrates an example where the game device 10 includes only one CPU core, the present invention is not so limited. The game device may be provided with a plurality of CPU cores which share processes by the CPU core 21 in an exemplary illustrative embodiment.

The first GPU 26 is connected to a first video-RAM (VRAM) 28. The second GPU 27 is connected to a second VRAM 29. In accordance with an instruction from the CPU core 21, the first GPU 26 generates a first game image on the basis of data used for image generation which is stored in the RAM 24, and writes the image into the first VRAM 28. Similarly, in accordance with an instruction from the CPU core 21, the second GPU 27 generates a second game image, and writes the image into the second VRAM 29. The first and second VRAMs 28 and 29 are connected to the LCD controller 31.

The LCD controller 31 includes a register 32. The register 32 stores a value of 0 or 1 in accordance with an instruction from the CPU core 21. If the value in the register 32 is 0, the LCD controller 31 outputs to the first LCD 11 the first game image written on the first VRAM 28, and also outputs to the second LCD 12 the second game image written on the second VRAM 29. Alternatively, if the value of the register 32 is 1, the first game image written on the first VRAM 28 is outputted to the second LCD 12, and the second game image written on the second VRAM 29 is outputted to the first LCD 11.

The wireless communication section 33 has a function of exchanging data for use in game processes and other data with a wireless communication section 33 of another game device. In an exemplary illustrative embodiment, it is assumed that a wireless communication section has a radio communication function in conformity with at least some features of the IEEE 802.11 wireless LAN standard, for example.

Note that the above configuration of the game device 10 is merely illustrative. Also, the game program and wireless communication program of an exemplary illustrative are supplied to the game device 10 not only via an external storage medium, such as the memory card 17, but also via a wired or wireless communication channel. Alternatively, the game program and wireless communication program of an exemplary illustrative may be previously stored in a nonvolatile storage device within the game device 10.

The operation of the game device 10 is described below.

The game device 10 is operable as a master device, which controls data transfer timing in the network, and is also operable as a slave device, which performs data transfer with the master device under the control of the master device. That is, the game device 10 has functions of both the master device and the slave device.

Figure 4:
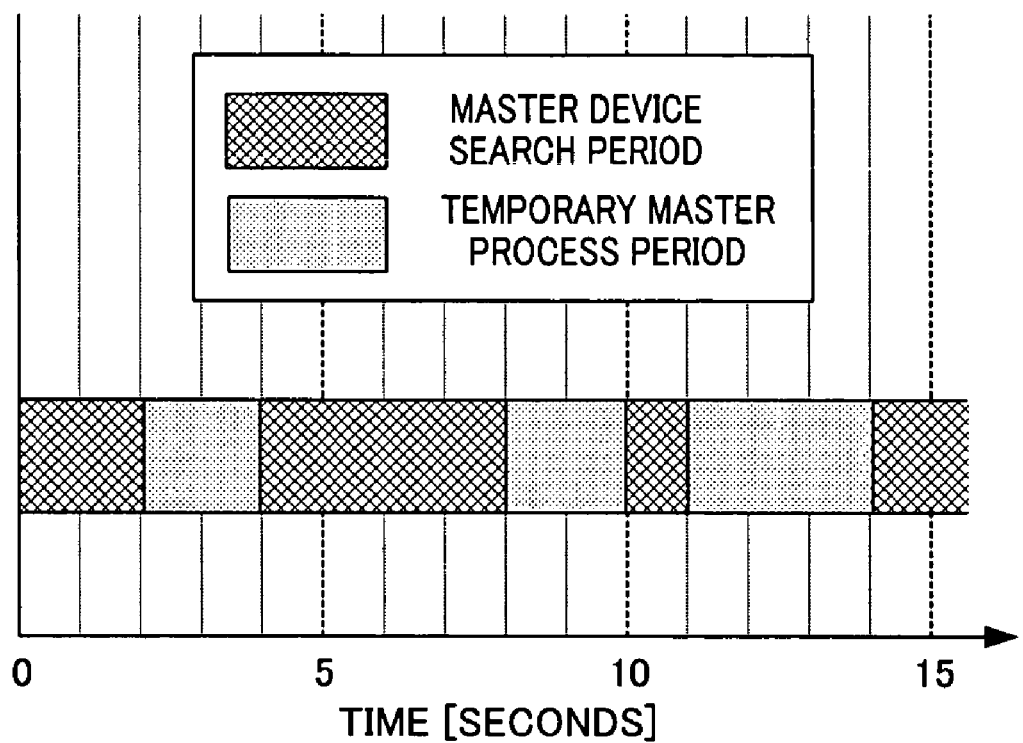
FIG. 4 is a diagram illustrating the operation of a game device.

FIG. 4 illustrates the operation of the game device 10 seeking to connect to a wireless network. The game device 10 is responsive to a request by the player or application software to connect to the wireless network, and alternately executes a master device search and a temporary master process. In this case, a time period for the master device search and a period for the temporary master process are each randomly set so as to be in the range between one second and four seconds. However, the range between one second and four seconds is merely illustrative, and a suitable range may be set in consideration of the transmission cycle of a beacon signal, which will be described later, and other conditions. In the example of FIG. 4, the initial master device search period is set at two seconds, the temporary master process that follows the initial master device search period is set at two seconds, the second master device search period is set at four seconds, and the second temporary master process period is set at two seconds.

The master device search period as described herein refers to a period for which to search for another game device acting as a master device or a temporary master device. The temporary master process period as described herein refers to a period in which to act as a temporary master device.

Figure 5:
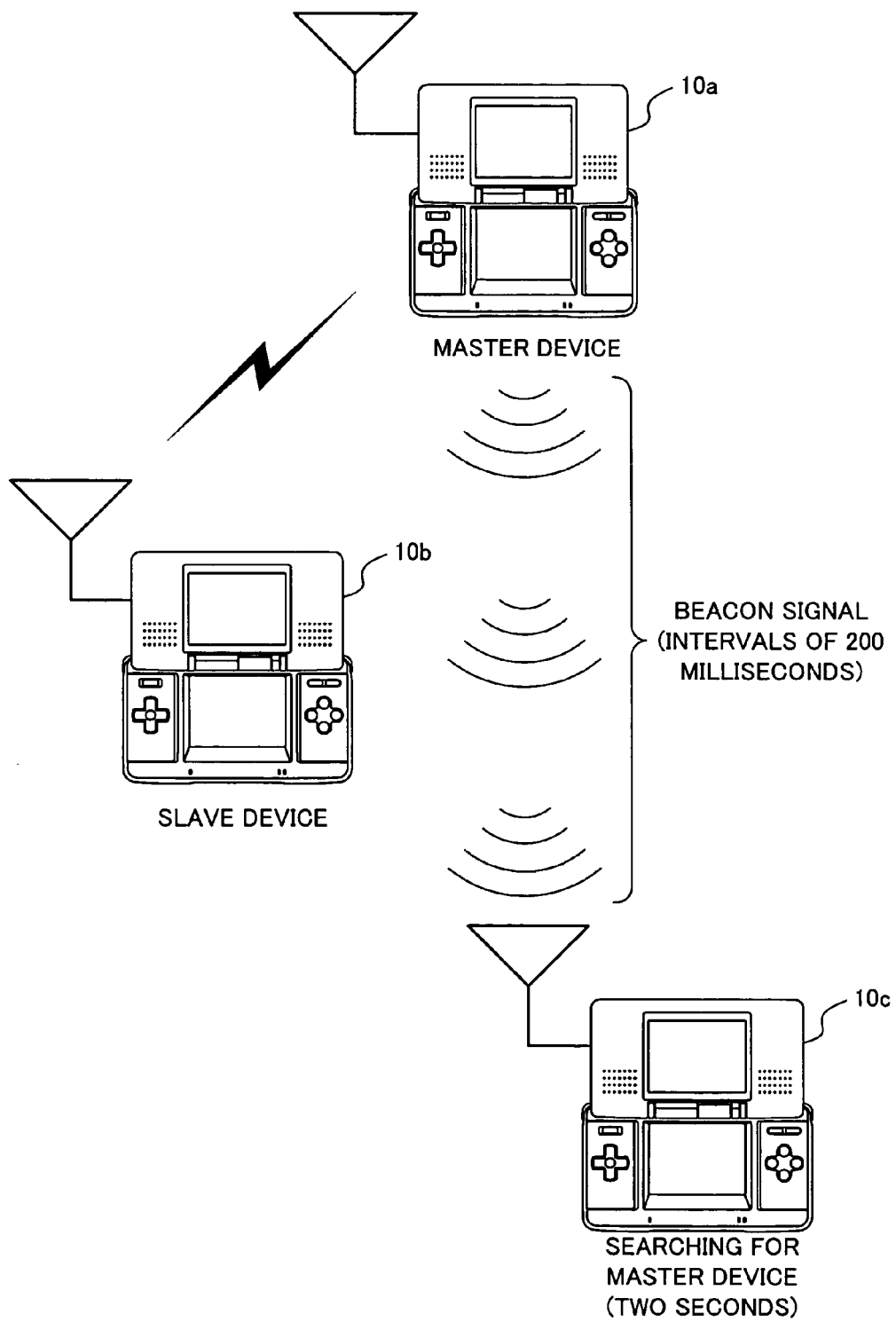
FIG. 5 is a diagram used for explaining a master device search.

Referring to FIG. 5, the operation performed by a game device of connecting to an existing wireless network is described. In FIG. 5, game devices 10a and 10b are included in a wireless network. It is assumed that the game device 10a acts as a master device and the game device 10b acts as a slave device. A game device acting as a master device (here, the game device 10a) transmits a beacon signal at intervals of 200 milliseconds. The beacon signal contains at least a MAC address used for communication by the game device that has transmitted the beacon signal, and information which indicates that the game device is a master device. In this state, if a game device 10c located within the reach of the beacon signal from the game device 10a is requested to connect to the wireless network, the game device 10c initially starts a master device search as shown in FIG. 4. The master device search lasts at least for one second or more, and therefore it is ensured that the game device 10c is able to receive the beacon signal, which is transmitted from the game device 10a at intervals of 200 milliseconds, during the initial master device search period. Upon receipt of the beacon signal, the game device 10c transmits a connection request signal to the game device 10a based on the MAC address included in the beacon signal, so that the game device 10c can join the wireless network comprising the game devices 10a and 10b. The connection request signal includes a MAC address of the source game device which has transmitted the signal.

Described next is an example where each of the three game devices 10a-10c outside of a wireless network simultaneously request to connect to the wireless network.

Figure 6:
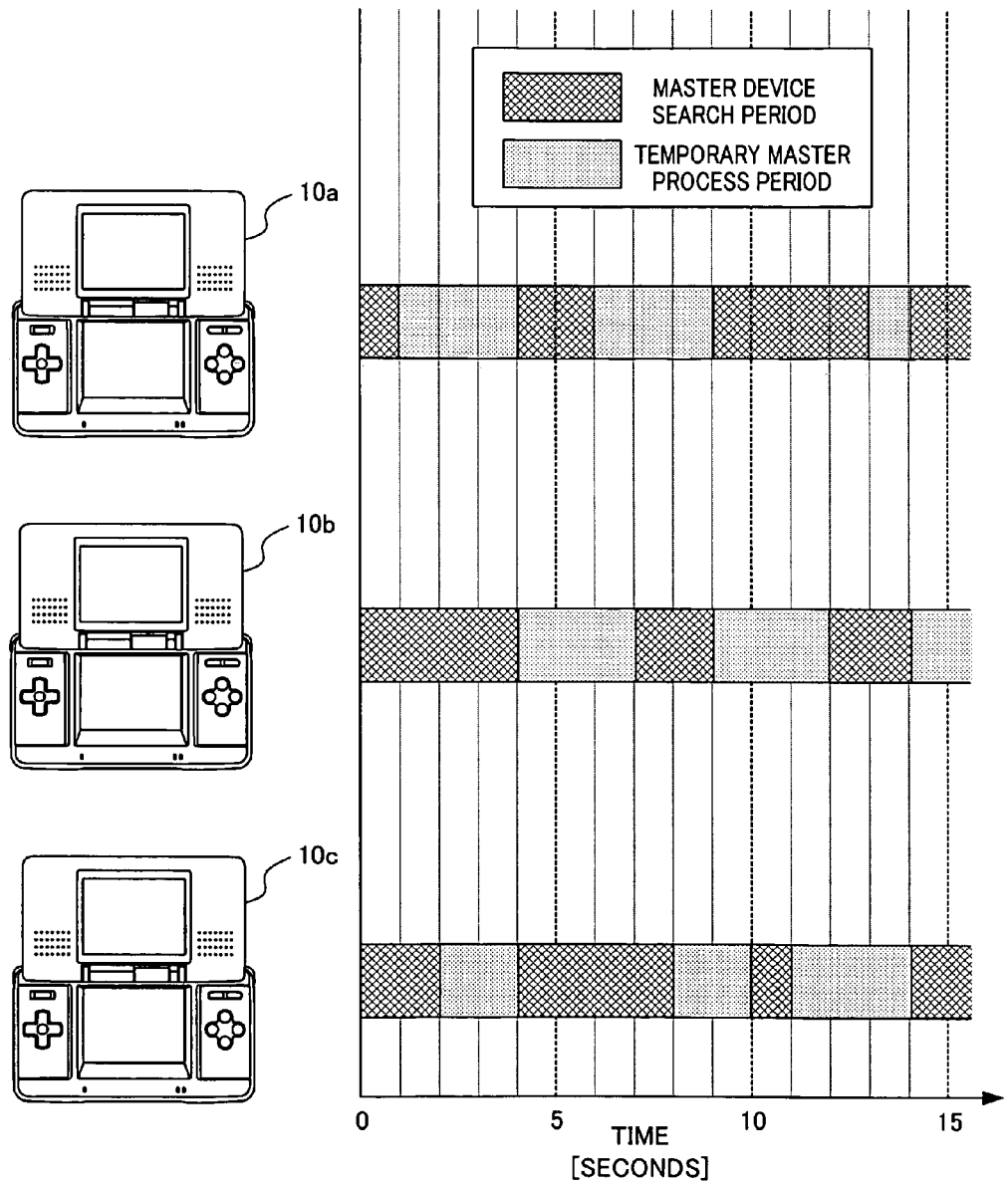
FIG. 6 is a diagram illustrating the operation of each game device.

If a connection request to connect to the wireless network simultaneously occurs in the game devices 10a-10c, the operation of each of the game devices 10a-10c is basically the same as that shown in FIG. 4. Specifically, as shown in FIG. 6, each of the game devices 10a-10c alternately executes the master device search and the temporary master process, and the period of the master device search and the period of the temporary master process are each randomly set within the range from one second to four seconds. In the example of FIG. 6, the initial master device search period of the game device 10a is set to one second, the initial master device search period of the game device 10b is set to four seconds, and the initial master device search period of the game device 10c is set to two seconds.

FIG. 7A illustrates the situation immediately after the connection request to connect the wireless network has occurred in each of the game devices 10a-10c. In this case, each of the game devices 10a-10c is unable to receive a beacon signal transmitted from a master device or a temporary master device, and therefore continues the master device search for some period of time.

The initial master device search period (one second) of the game device 10a ends one second after the situation shown in FIG. 7A, and as shown in FIG. 7B, the game device 10a ceases the master device search and starts the temporary master process. In the temporary master process period, the game device 10a acts as a temporary master device, and transmits a beacon signal in a manner similar to the master device. The beacon signal contains at least a MAC address used for communication by the game device, which has transmitted the beacon signal, and information which indicates that the game device is the temporary master device.

At the time point, when the game device 10a starts transmitting the beacon signal, the game devices 10b and 10c are still in the master device search. Accordingly, the game devices 10b and 10c each receive the beacon signal transmitted by the game device 10a, and transmit a connection request signal to the game device 10a acting as the temporary master device, based on the MAC address of the game device 10a which is included in the beacon signal.

Figure 7C:
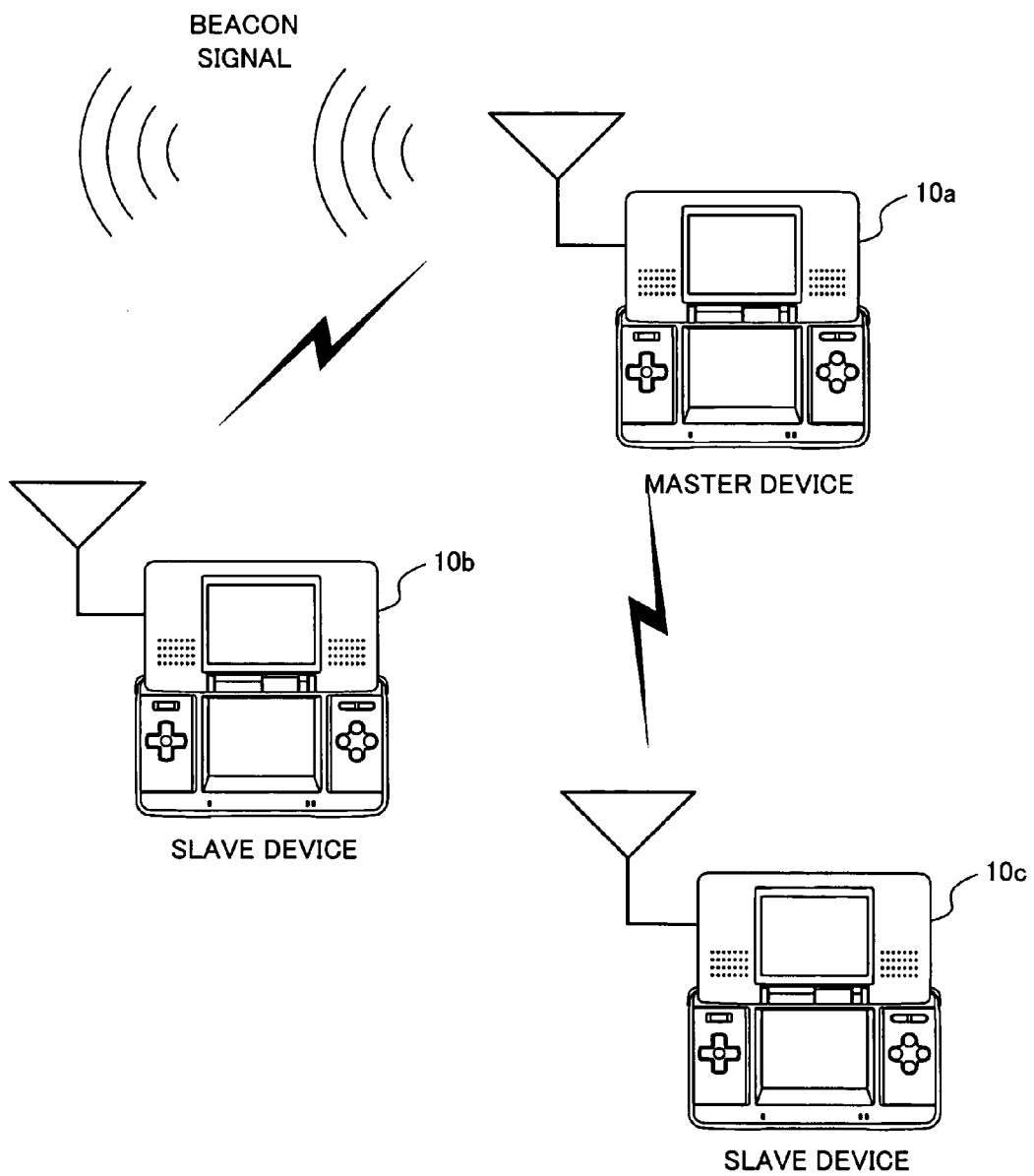
FIG. 7C is still another diagram used for explaining the operation performed by each game device for constructing a network.

Upon receipt of the connection request signals from the game devices 10b and 10c, the game device 10a ceases the operation as shown in FIG. 6 of alternately repeating the master device search and the temporary master process, and starts acting as a master device of a wireless network comprised of the game devices 10a-10c. Also, the game devices 10b and 10c each cease the operation as shown in FIG. 6 of alternately repeating the master device search and the temporary master process, and start acting as a slave device of the wireless network comprised of the game devices 10a-10c. In this manner, a wireless network as shown in FIG. 7C is constructed. Note that in this example, among the three game devices 10a-10c, the game device 10a is the one having started the temporary master process and therefore acts as the master device. However, as described earlier, the master device search period is randomly set for each game device, and therefore it is randomly determined as to which game device becomes the master device.

Note that after the wireless network as shown in FIG. 7C is constructed, any game device may be disconnected from the network. For example, the game device 10b is disconnected from the wireless network when the player or application software requests disconnection from the network, when the game device 10b is turned off, or when the distance from the game device 10a exceeds the range in which communication is possible. Similarly, the game device 10a is disconnected from the wireless network when the player or application software requests disconnection from the network, when the game device 10a is turned off, or when the distances from the game devices 10b and 10c exceed the range in which communication is possible. If any slave device is disconnected from the network, the master device remains in the network, and therefore the wireless network itself does not cease to exist, and is maintained by the master device and any remaining slave device. However, if the master device is disconnected from the network, the wireless network itself ceases to exist. Operations of the game devices 10b and 10c after the game device 10a acting as the master device is disconnected from the network in the situation shown in FIG. 7C are described below.

Figure 8A:
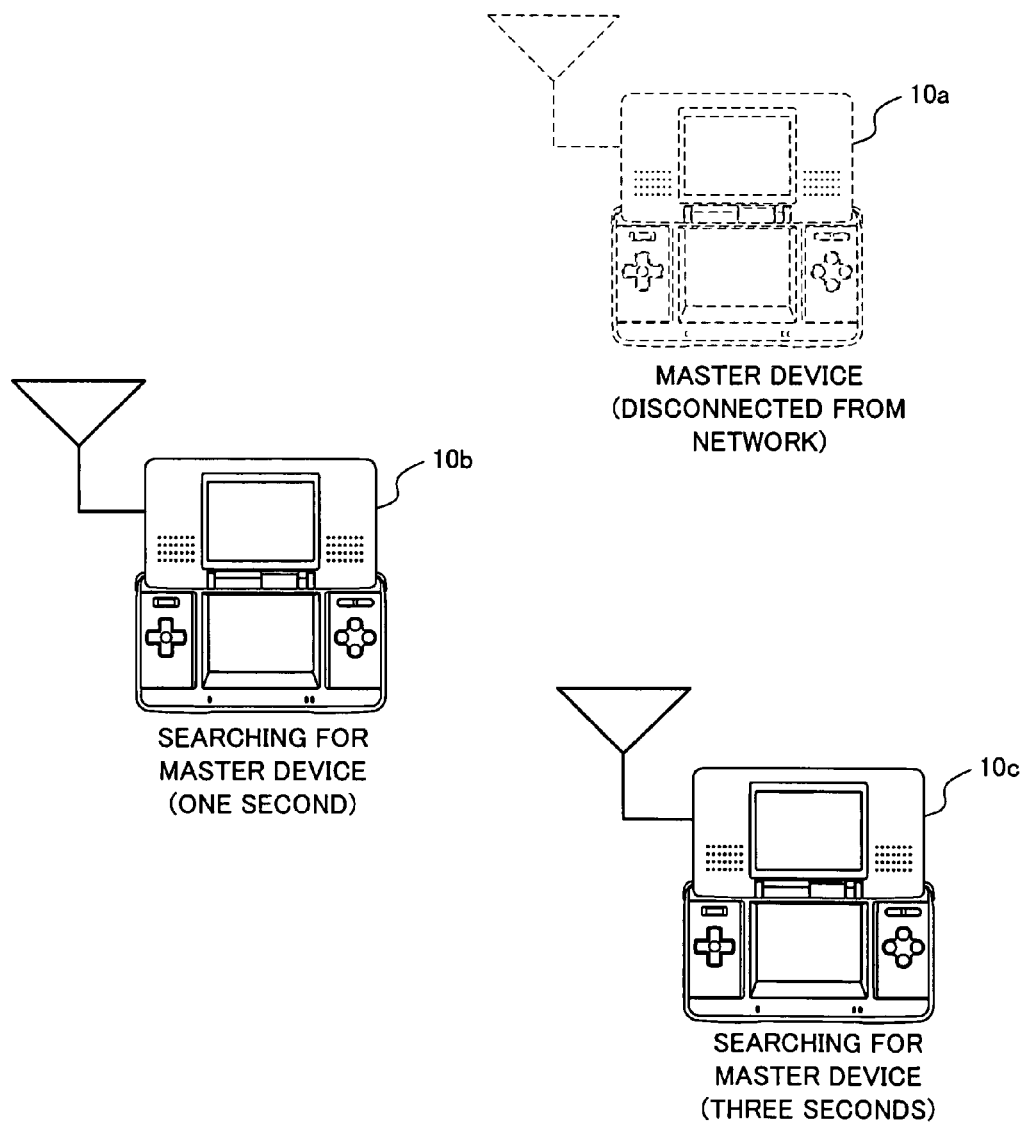
FIG. 8A is a diagram used for explaining the operation performed by each game device when a master device is disconnected from a network.

FIG. 8A illustrates the situation immediately after the game device 10a acting as the master device is disconnected from the network in the situation shown in FIG. 7C. When it is detected that the game device 10a is disconnected from the network, the game devices 10b and 10c each alternately execute the master device search and the temporary master process, as shown in FIG. 4, to reconstruct the network. In this case, the master device search period and the temporary master process period are each randomly set between one second and four seconds.

When the game device 10a is disconnected from the network, if there is any game device (hereinafter referred to as a "game device X") operating as a master device or a temporary master device within the range where communication with the game device 10b (or the game device 10c) is possible, the game device 10b (or the game device 10c) receives a beacon signal transmitted from the game device X in the initial master device search period, and transmits a connection request signal to the game device X. In this manner, the game device 10b (or the game device 10c) connects to another wireless network where the game device X operates as a master device.

On the other hand, when the game device 10a is disconnected from the network, if there is no game device operating as a master device or a temporary master device within the range where communication with the game devices 10b and 10c is possible, the game devices 10b and 10c are unable to receive a beacon signal transmitted from the master device or the temporary master device, and therefore continues the master device search for some period of time. Then, the initial master device search period (one second) of the game device 10b ends one second after the situation shown in FIG. 8A, the game device 10b ceases the master device search and starts the temporary master process as shown in FIG. 8B. In the temporary master process period, the game device 10b acts as a temporary master device, and transmits a beacon signal. At the time point when the game device 10b starts transmitting the beacon signal, the game device 10c is still in the master device search. Accordingly, the game device 10c receives the beacon signal transmitted by the game device 10b, and transmits a connection request signal to the game device 10b, which is the temporary master device, based on the MAC address of the game device 10b contained in the beacon signal. Upon receipt of the connection request signal from the game device 10c, the game device 10b ceases the operation of alternately repeating the master device search and the temporary master process, and it starts acting as a master device of a wireless network comprised of the game devices 10b and 10c. Also, the game device 10c ceases the operation of alternately repeating the master device search and the temporary master process, and it starts acting as a slave device of the wireless network comprised of the game devices 10b and 10c. In this manner, the wireless network in which the game device 10b acts as the master device and the game devices 10b and 10c act as the slave devices is constructed. In this example, among the two game devices 10b and 10c, the game device 10b initially starts the temporary master process, and therefore the game device 10b becomes the master device. However, as described earlier, the master device search period is randomly set for each game device, and therefore it is randomly determined as to which game device acts as the master device.

In the above example, when the game device 10a is disconnected from the network in the situation shown in FIG. 8, if there is any game device X operating as a master device or a temporary master device within the range where communication with the game device 10b (or the game device 10c) is possible, the game device 10b (or the game device 10c) connects to a wireless network where the game device X operates as a master device. However, in some cases where the master device is disconnected from a network, depending on the type of the game, it is preferable to reconstruct the network between slave devices having previously belonged in the same network (in the example shown in FIG. 8A, the game devices 10b and 10c), rather than to connect to another wireless network. For example, in the case of games having a chat function which enables players to exchange messages with each other through a wireless network, even if a master device is disconnected from the network, members in the same network might wish to continue message exchanges with each other. An example where a network is reconstructed by slave devices having previously belonged in the same network when a master device is disconnected from the network is described below with reference to FIGS. 9A-9C.

Figure 9A:
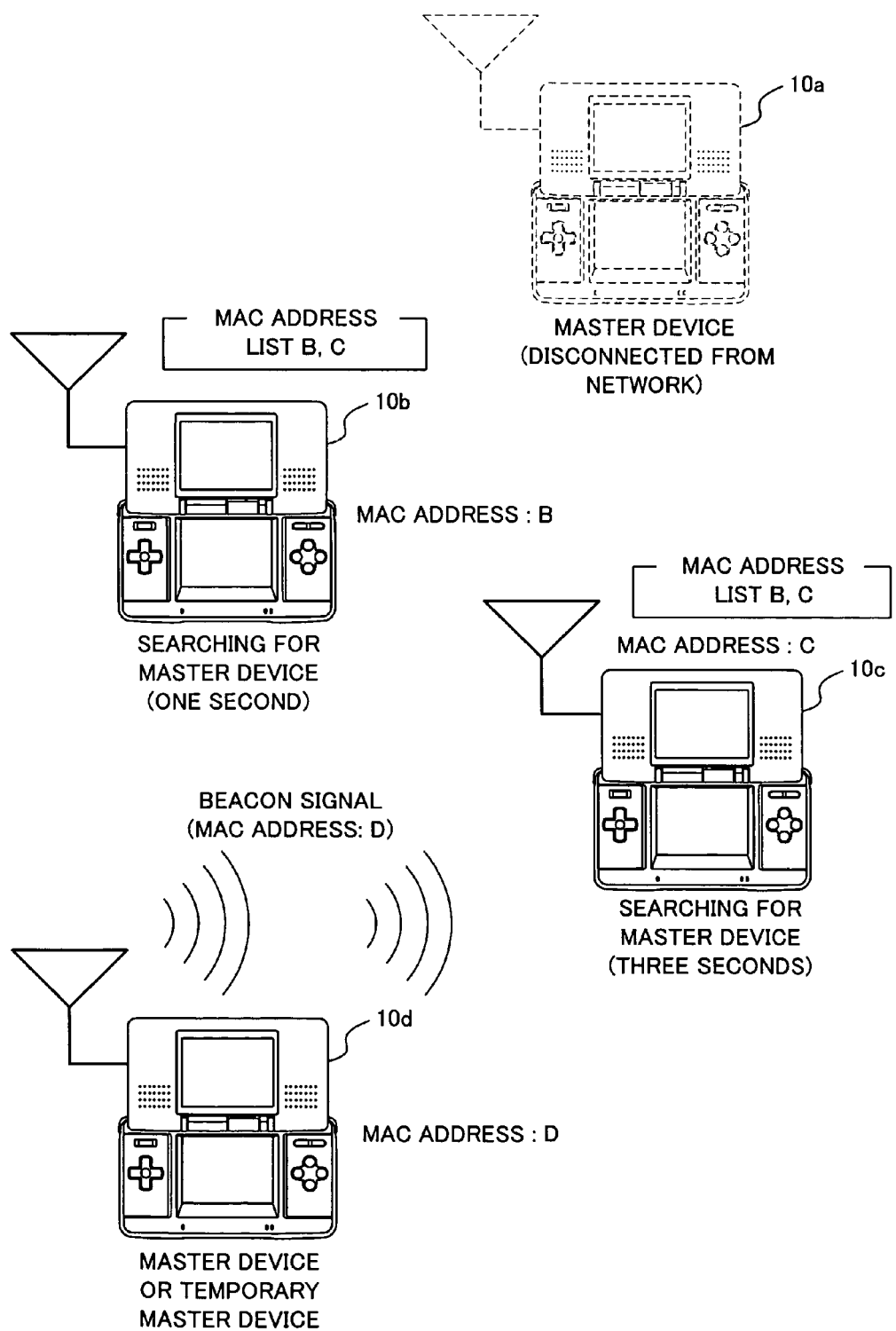
FIG. 9A is a diagram used for explaining a variation of the operation performed by each game device when a master device is disconnected from a network.

FIG. 9A illustrates the situation immediately after the game device 10a acting as a master device has been disconnected from the network in the situation shown in FIG. 7C. FIG. 9A differs from FIG. 8A in that the game devices 10b and 10c each have a MAC address list including MAC addresses of the game devices 10b and 10c, and a game device 10d acting as a master device or a temporary master device is present in the vicinity of the game devices 10b and 10c.

The MAC address list shown in FIG. 9A is a list of MAC addresses of all slave devices having previously belonged in a network before the network ceased to exist. This list is transmitted from the game device 10a, which is a master device, to the game devices 10b and 10c, which are slave devices, before the game device 10a acting as the master device is disconnected from the network. For example, the transmission of the MAC address list from the master device to the slave devices may be periodically performed at regular intervals, or may be performed each time the network configuration is changed, e.g., when a new game device joins the network.

If the game device 10a acting as the master device is disconnected from the network in the situation as shown in FIG. 7C, the game devices 10b and 10c start the master device search as shown in FIG. 9A. At this time, the game device 10d transmits a beacon signal, and therefore the game devices 10b and 10c receive the beacon signal. Upon receipt of the beacon signal, the game devices 10b and 10c determine whether their respective MAC address lists include a MAC address included in the beacon signal (i.e., the MAC address of the game device 10d). Here, the MAC address included in the beacon signal is not included in the MAC address lists, and therefore the game devices 10b and 10c ignore the game device 10d, and continue the master device search.

Figure 9B:
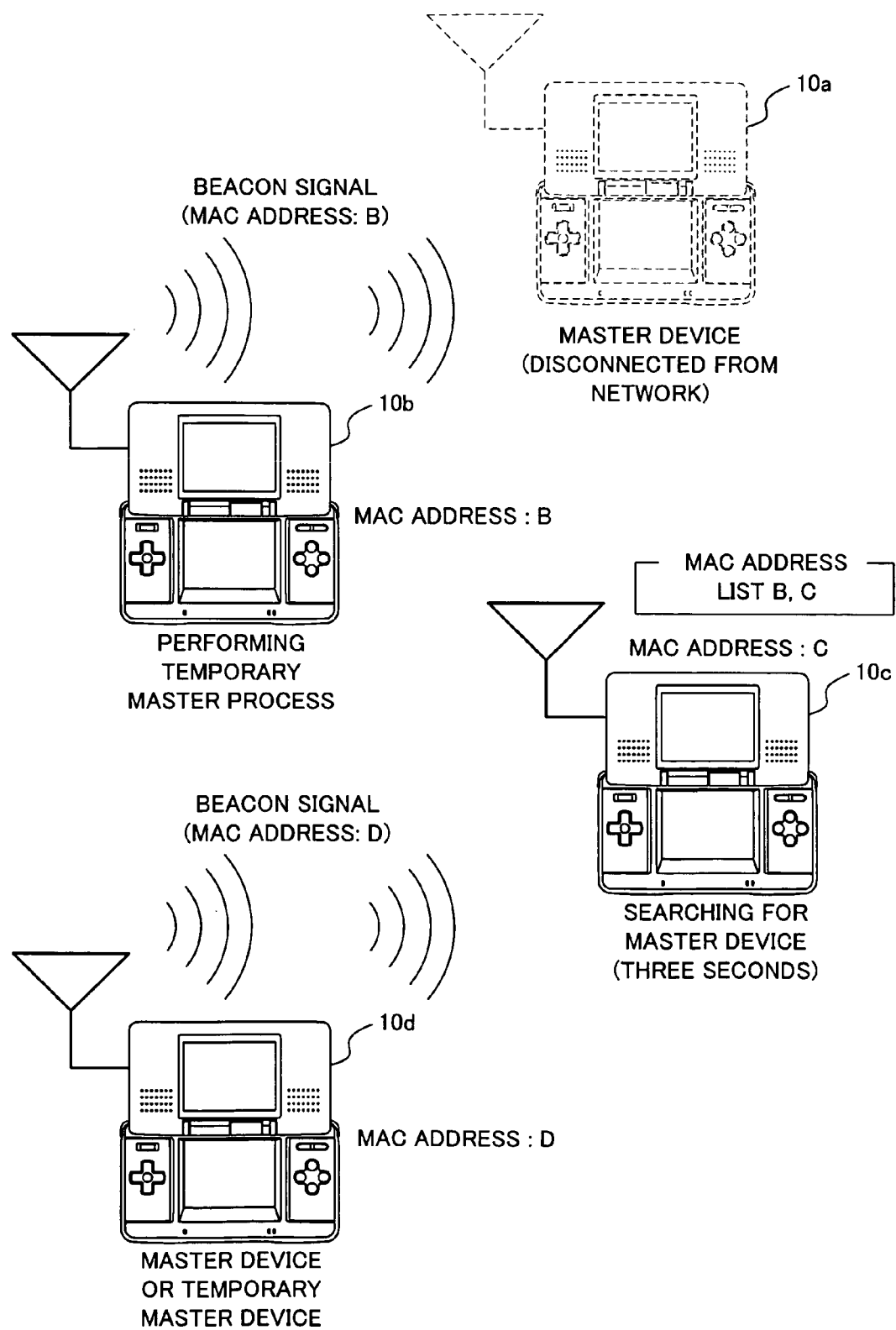
FIG. 9B is another diagram used for explaining a variation of the operation performed by each game device when a master device is disconnected from a network.
Figure 9C:
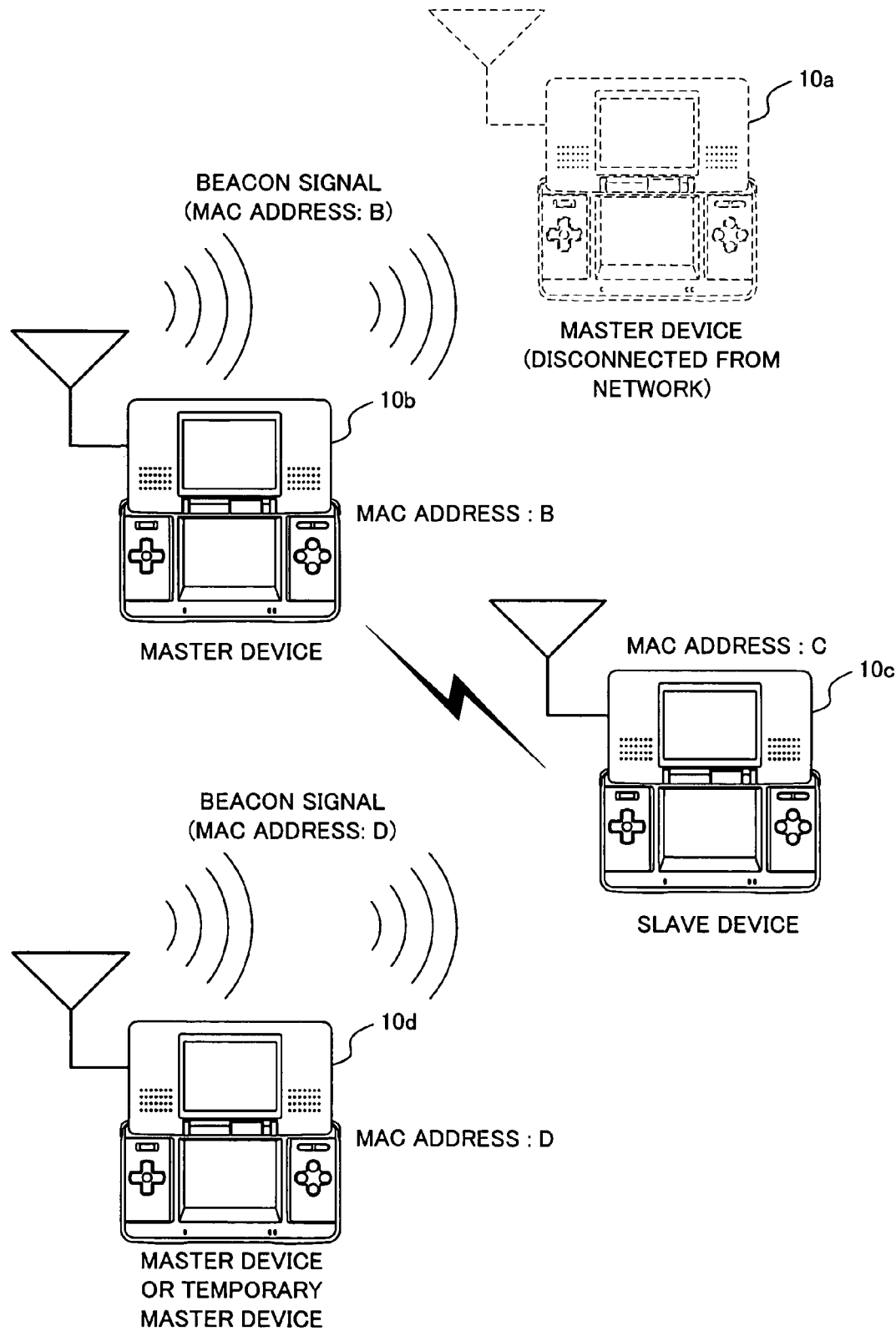
FIG. 9C is still another diagram used for explaining a variation of the operation performed by each game device when a master device is disconnected from a network.

The initial master device search period (one second) of the game device 10b ends one second after the situation shown in FIG. 9A, and the game device 10b terminates the master device search and starts the temporary master process as shown in FIG. 9B. At this point in time, the game device 10c is still in the master device search. Accordingly, the game device 10c receives a beacon signal transmitted by the game device 10b, and determines whether a MAC address contained in the beacon signal (i.e., the MAC address of the game device 10b) is included in its own MAC address list. Here, the MAC address list includes the MAC address included in the beacon signal, and therefore a connection request signal is transmitted to the game device 10b acting as a temporary master device. Upon receipt of the connection request signal from the game device 10c, the game device 10b terminates the operation of alternately repeating the master device search and the temporary master process, and starts operating as a master device of a wireless network constructed by the game devices 10b and 10c. Also, the game device 10c terminates the operation of alternately repeating the master device search and the temporary master process, and starts the operation as a slave device in the wireless network constructed by the game devices 10b and 10c. In this manner, a wireless network including the game device 10b acting as a master device and the game devices 10b and 10c acting as slave devices is constructed.

In an exemplary illustrative embodiment, the MAC address is used for determining whether a game device having transmitted a beacon signal has previously belonged in a network immediately before the master device was disconnected from the network. However, any identification information may be used instead of the MAC address so long as game devices can be distinguished from each other.

As described above, by storing a MAC address list of slave devices included in a network, the network can be reconstructed by slave devices in the same network even if the master device is disconnected from the network. In this method, however, in the case as shown in FIG. 10A where game devices 10a and 10c are concurrently disconnected (for example, when the game devices 10a and 10c are simultaneously turned off, when a game device 10b moves out of the range where communication with the game devices 10a and 10c is possible, and how soon), the game device 10b is unable to connect to the network even by repeating the master device search and the temporary master process sometimes. A similar problem may occur when a master device is disconnected from a network comprised of two game devices. Accordingly, in order to prevent such a problem, it may be so configured that a slave device previously having belonged in a network which ceased to exist uses the MAC address list to attempt to connect to another slave device having previously belonged in the same network and thereby to reconstruct the network for a predetermined period of time (e.g., four seconds) after the network ceases to exist, and after the lapse of the predetermined period of time since the network ceases to exist, the slave device attempts to connect not only to the slave device having previously belonged in the same network but also to a master device or temporary master device located in the range where communication is possible. In the example of FIG. 10A, the game device 10b ignores the game device 10d during the initial master device search period (three seconds), but the game device 10b receives a beacon signal from the game device 10d in the master device search period at four seconds after the network ceases to exist and transmits a connection request signal to the game device 10d. As such, the game device 10b joins a wireless network in which the game device 10d acts as a master device as shown in FIG. 10B.

As described above, in an exemplary illustrative embodiment, the master device search period and the temporary master process period are randomly set, and therefore there is a slight possibility that a plurality of game devices might have the initial master device search period set to start at the same time. If the plurality of game devices have the initial master device search period set to start at the same time, the plurality of game devices concurrently start the temporary master process, and if no measures are taken, a plurality of networks where the plurality of game devices act as a master device might be generated. For example, in order to avoid, such a problem, if a game device detects a plurality of master devices or temporary master devices during the master device search, a connection request signal is transmitted to one of the plurality of master devices or temporary master devices that has a MAC address indicative of a higher priority. Alternatively, if a game device detects a plurality of master devices or temporary master devices during the master device search, no connection request is transmitted to any of the master devices or temporary master devices, the game device waits until only one master device or temporary master device is detected, and then transmits a connection request to the detected master device or temporary master device. However, even if any of the above-mentioned measures are taken, the processing load on the game device is increased due to such measures, and in some cases, a considerable period of time might be taken for network construction. Accordingly, it is preferable that a plurality of game devices do not have the initial master device search period set to start at the same time. A corresponding preferred exemplary illustrative embodiment is described below with reference to FIGS. 11 and 12.

Figure 12:
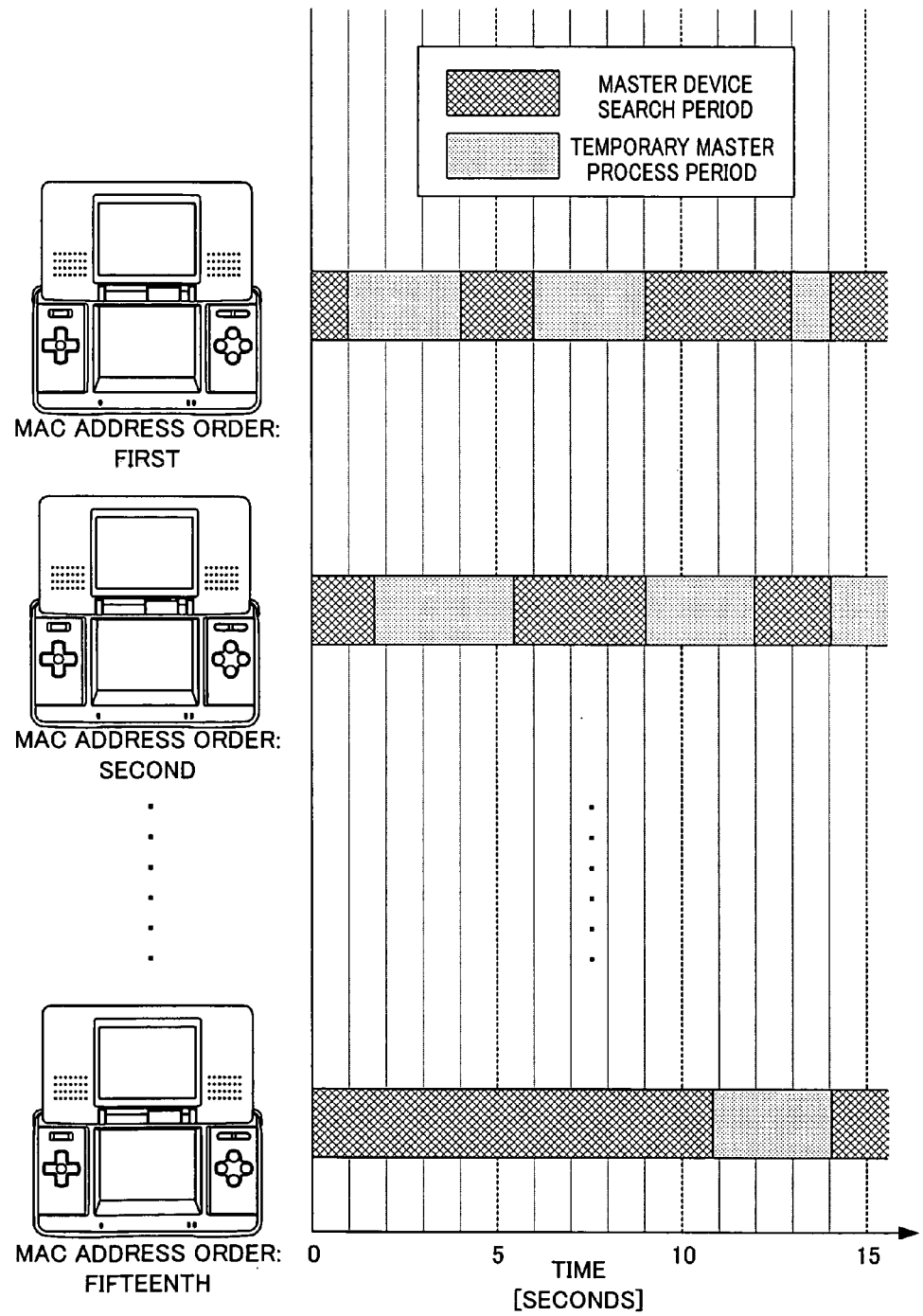
FIG. 12 is a diagram illustrating the operation performed by each game device when the initial master device search period has been determined in accordance with the MAC address order.

In this exemplary illustrative embodiment, the MAC address list as shown in FIG. 10A is used such that a plurality of game devices have the initial master device search period set so as not to start at the same time. Specifically, when a master device is disconnected from a network, each slave device sorts MAC addresses included in the MAC address list based on values of the MAC addresses (e.g., in descending order of priority), and calculates its position in the order of MAC addresses based on the result of sorting. With reference to a table as shown in FIG. 11 or a calculation formula, the initial master device search period is determined based on the calculated position in the MAC address order. Here, different positions in the MAC address order are assigned with different master device search periods, and therefore a plurality of game devices do not have the initial master device search period set to start at the same time. FIG. 12 illustrates the operation performed by each slave device when a master device is disconnected from a network. In FIG. 12, the initial master device search period of each game device is determined in accordance with the order of MAC addresses, and a temporary master process period and subsequent master device search periods (second and subsequent master device search periods) which follow the initial master device search period are randomly set in the range from one second to four second as in the case shown in FIG. 4.

In an exemplary illustrative embodiment, game devices are sorted by MAC addresses. However, the order of game devices may be determined by sorting the game devices by individual numbers arbitrarily assigned to the game devices (MAC addresses, serial numbers, IP addresses, etc.).

Figure 13:
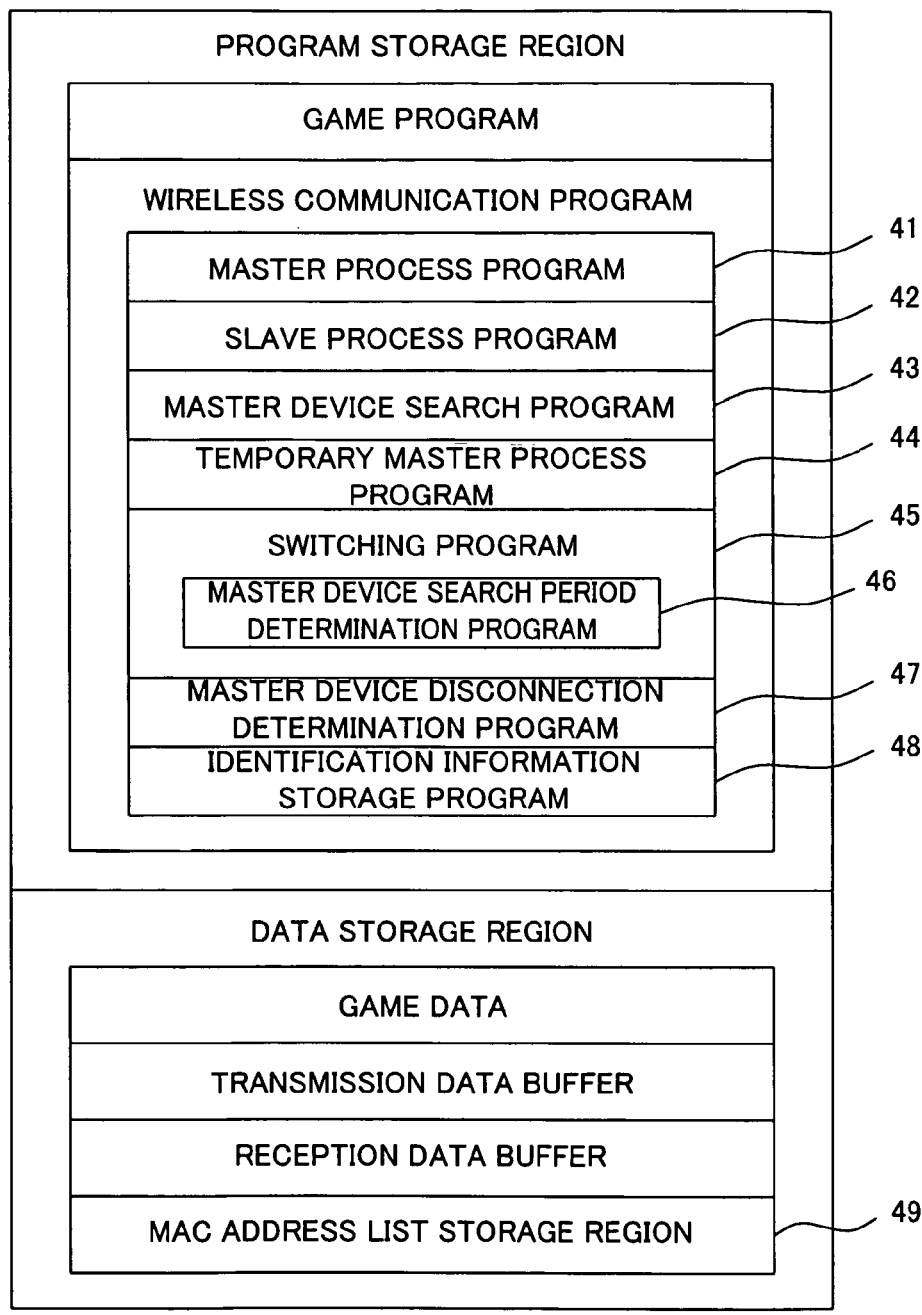
FIG. 13 is a memory map of a RAM 24.

Next, referring to a memory map shown in FIG. 13 and the flowcharts shown in FIGS. 14-18, the procedure of processes performed by the CPU core 21 when the above-described operations of a game device are realized by software (e.g., a wireless communication program) is described. Note that these flowcharts illustrate only portions of the processes executed by the CPU core 21 that are related to wireless communication. Indeed, the CPU core 21 is capable of executing processes based on a game program in parallel with processes based on a wireless communication program, which makes it possible to allow a game process to progress by suitably exchanging data required for the game process with another game device.

FIG. 13 is a memory map of the RAM 24. The storage region of the RAM 24 is generally classified into a program storage region and a data storage region.

In the program storage region, a game program and a wireless communication program, which are read from the ROM 17a of the memory card 17 are stored. The wireless communication program includes, by way of example, a master process program 41, a slave process program 42, a master device search program 43, a temporary master process program 44, a switching program 45, a master device disconnection determination program 47, and an identification information storage program 48. Also, the switching program 45 includes a master device search period determination program 46. Here, the wireless communication program is comprised of, but not limited to, a plurality of programs each realizing a single function.

The master process program 41 is a program for causing the game device 10 to act as a master device. The slave process program 42 is a program for causing the game device 10 to act as a slave device. The master device search program 43 is a program for causing the game device 10 to perform a master device search. The temporary master process program 44 is a program for causing the game device 10 to perform a temporary master process. The switching program 45 is a program for controlling the timing of switching the game device 10 between a master device search operation and a temporary master process operation. For example, the switching program 45 includes a process for randomly setting the master device search period and the temporary master process period. The master device search period determination program 46 is a program for setting the initial master device search period based on a MAC address list as described in conjunction with FIGS. 11 and 12. The master device disconnection determination program 47 is a program for determining whether a master device is disconnected from a network. The identification information storage program 48 is a program for receiving a MAC address list from a master device and storing the MAC address list to the RAM 24.

In the data storage region, game data for use in the game program is stored. Also, the data storage region is used as a transmission data buffer for temporarily storing data to be transmitted to another game device and as a reception data buffer for temporarily storing data received from another game device. Also, the data storage region includes a MAC address list storage region 49 for storing a MAC address list obtained from a master device by the identification information storage program 48.

Figure 14:
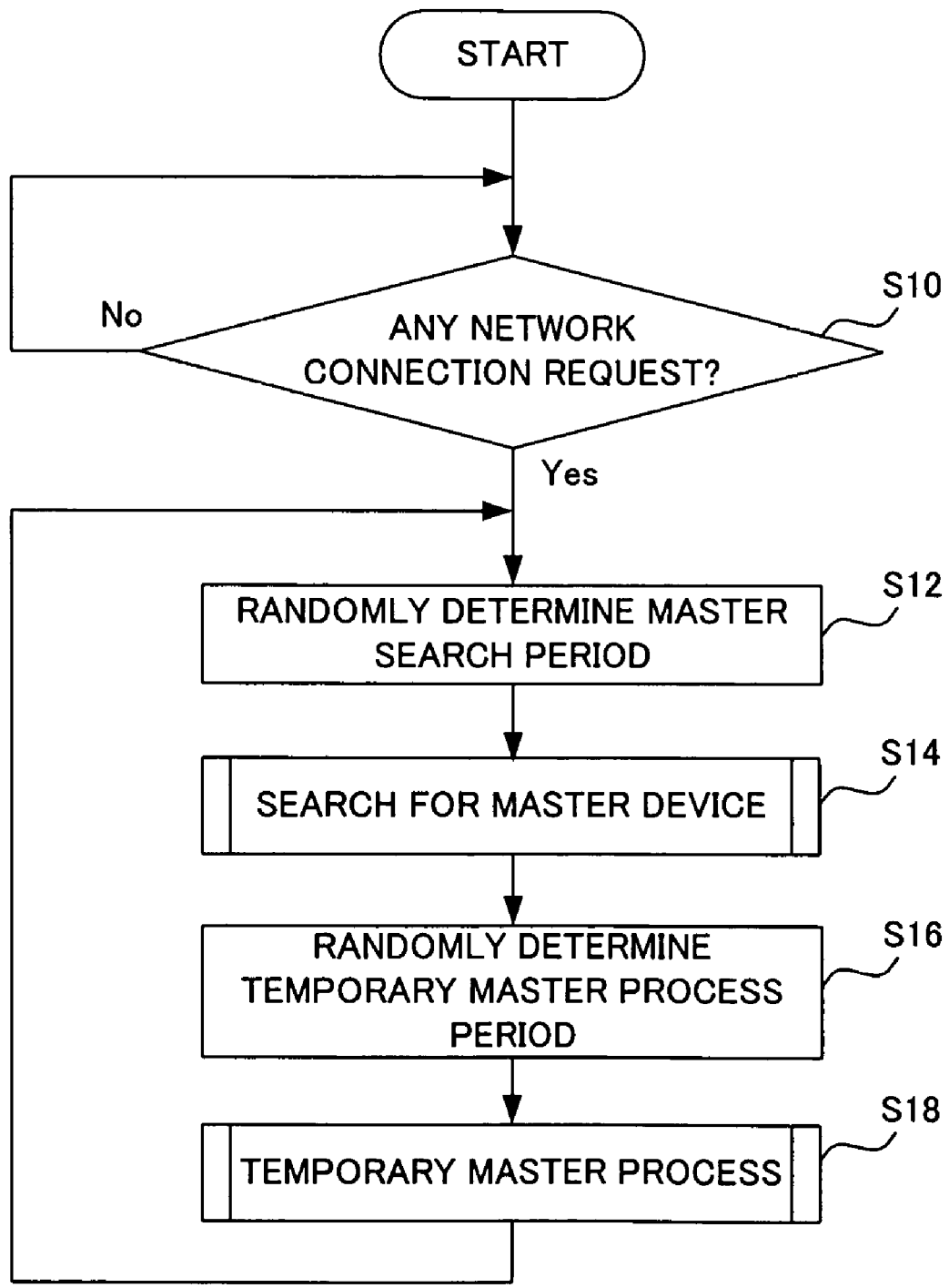
FIG. 14 is a flowchart of a wireless communication based on a wireless communication program.

In FIG. 14, when a wireless communication program is started, the CPU core 21 determines at step S10 whether a network connection request has been given by a game program or a player. If it is determined that no network connection request has been given, the CPU core 21 waits for a network connection request to be given, and when the network connection request is given, the control proceeds to step S12.

At step S12, a master device search period is randomly set in the range from one second to four seconds. The determined master device search period is stored in a suitable region of the RAM 24.

At step S14, a master device search is performed. The master device search will be described in detail later with reference to FIG. 15.

At step S16, a temporary master process period is randomly set in the range from one second to four seconds. Here, the determined temporary master process period is also stored in a suitable region of the RAM 24.

At step S18, a temporary master process is performed. The temporary master process will be described in detail later with reference to FIG. 16.

In this manner, by repeating steps S12-S18, the operation of the game device as shown in FIG. 4 is realized.

Next, the details of the master device search performed at step S14 in FIG. 14 are described with reference to FIG. 15.

Figure 15:
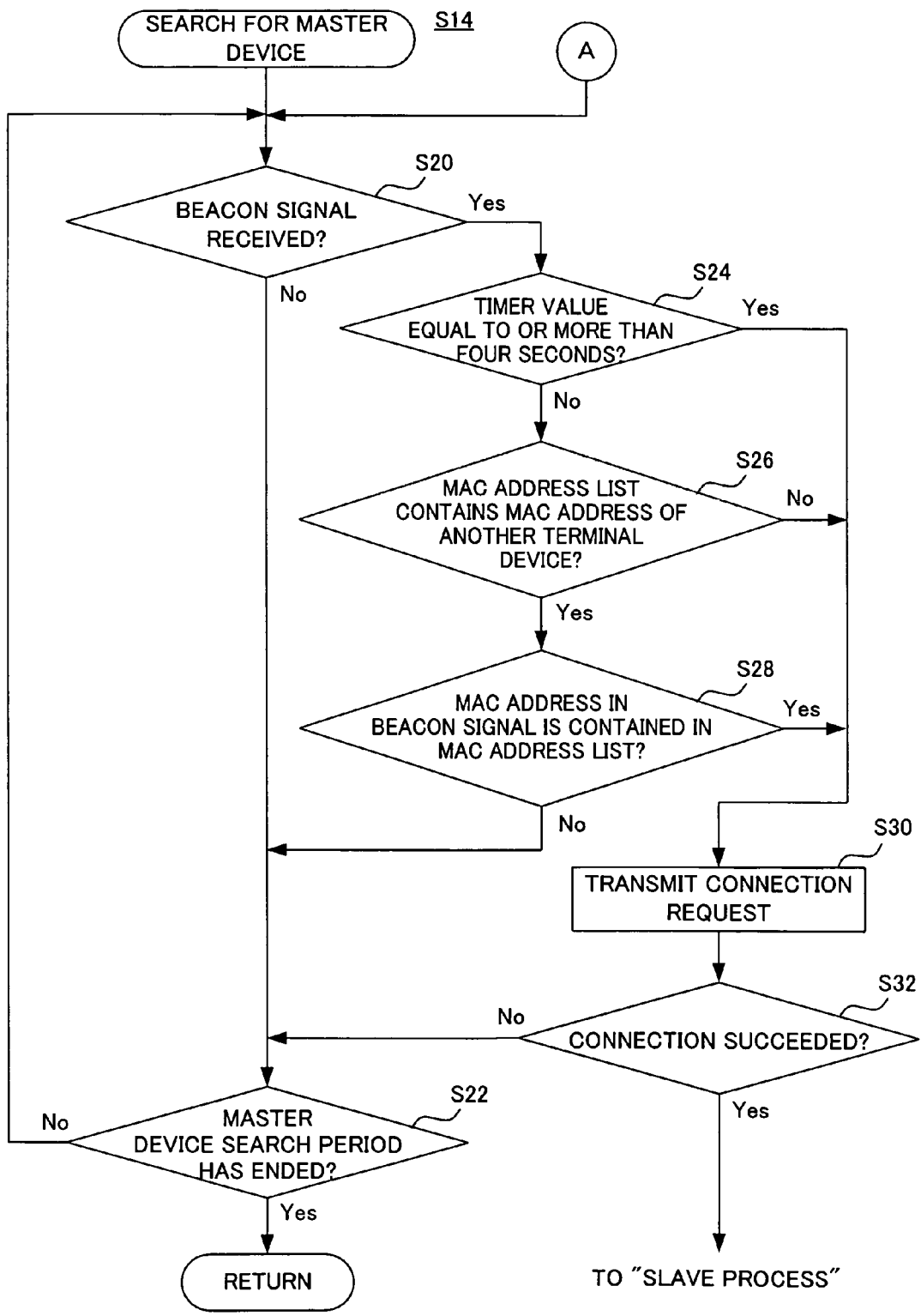
FIG. 15 is a flowchart showing the details of a master device search.

At step S20 in FIG. 15, the CPU core 21 determines whether a beacon signal has been received from another game device (game device acting as a master device or a temporary master device). If no beacon signal has been received, the control proceeds to step S22, and if the beacon signal has been received, the control proceeds to step S24.

At step S22, it is determined whether the master device search period randomly set at step S12 in FIG. 14 (or a master device search period set in accordance with the order of MAC addresses at step S52 in FIG. 17 which will be described later) has ended. If the master device search period has not ended, the control returns to step S20, and if the master device search period has ended, the control proceeds to step S16 in FIG. 14.

At step S24, it is determined whether the value of a timer having started counting at step S54 in FIG. 17 which will be described later is four seconds or more. If the timer value is less than four seconds, the control proceeds to step S26, and if the timer value is four seconds or more, the control proceeds to step S30. As described with reference to FIGS. 10A and 10B, at step S24, the operation of the game device 10 is switched such that a slave device having previously belonged in a network which ceased to exist attempts to connect to another slave device having previously belonged in the same network and thereby to reconstruct the network for a predetermined period of time after the cease of existence of the network, and after the lapse of the predetermined period of time since the cease of existence of the network, the slave device attempts transmits a connection request signal not only to the slave device having previously belonged in the same network but also to a master device or temporary master device located in the range where communication is possible.

At step S26, it is determined whether a MAC address list is stored in the MAC address list storage region 49, and if so, it is determined whether the MAC address list contains a MAC address of any other game device. If the MAC address list contains the MAC address of that other game device, the control proceeds to step S28, and if the MAC address list does not contain the MAC address of that other game device, the control proceeds to step S30.

At step S28, it is determined whether the MAC address list stored in the MAC address list storage region 49 contains a MAC address contained in the received beacon signal (i.e., the MAC address of a game device having transmitted the beacon signal). If the MAC address contained in the beacon signal is contained in the MAC address list, the control proceeds to step S30, and if it is not contained in the MAC address list, the control proceeds to step S22.

At step S30, a connection request signal is transmitted to the game device having transmitted the beacon signal based on the MAC address contained in the received beacon signal.

At step S32, whether connection has been succeeded is determined based on a response signal from the game device having transmitted the beacon signal. If the connection is successful, the control proceeds to a "slave process" in FIG. 17, and if the connection is failed, the control proceeds to step S22.

Next, the details of the temporary master process at step S18 in FIG. 14 are described with reference to FIG. 16.

Figure 16:
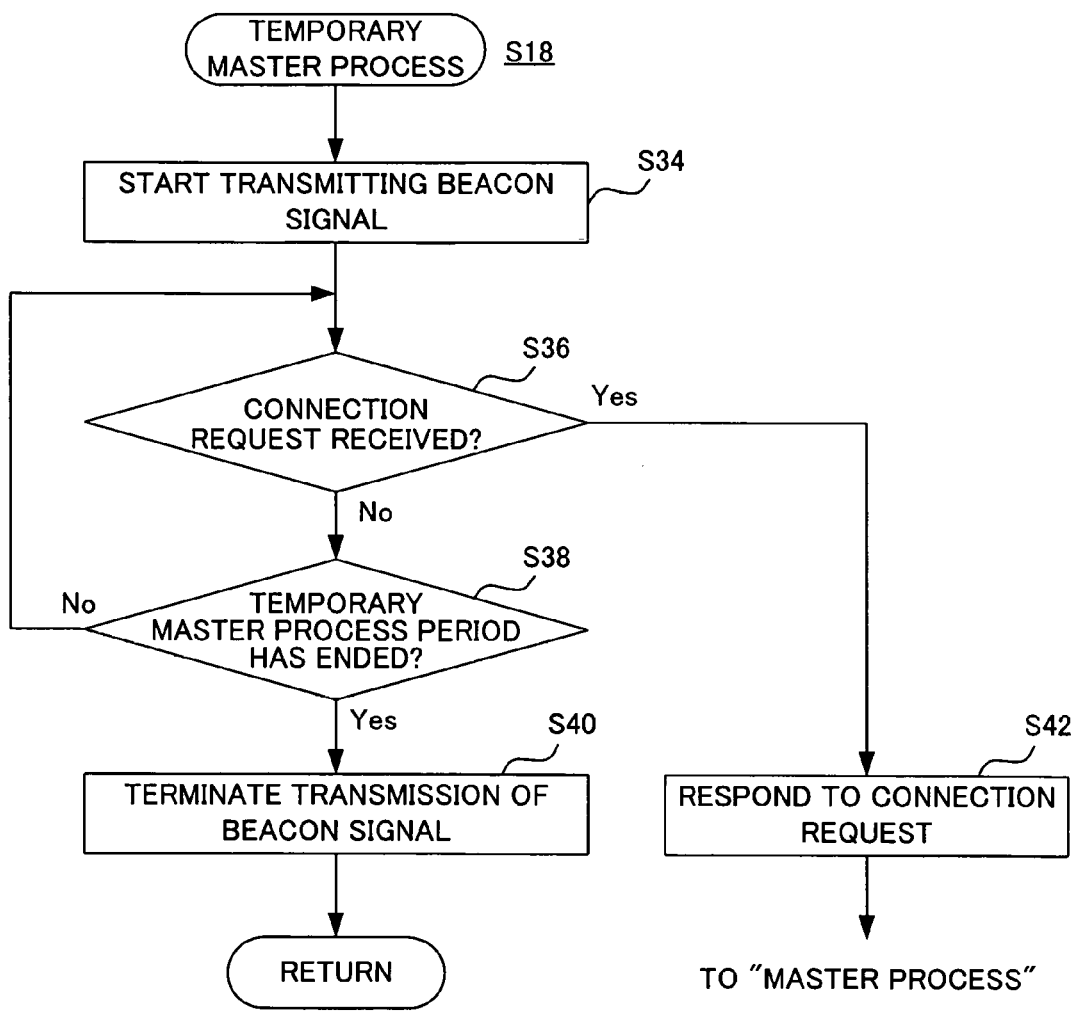
FIG. 16 is a flowchart showing the details of a temporary master process.

At step S34 in FIG. 16, the CPU core 21 starts transmitting a beacon signal.

At step S36, it is determined whether a connection request signal from another game device has been received. If the connection request signal has been received from another game device, the control proceeds to step S42, and if not, the control proceeds to step S38.

At step S38, whether the temporary master process period set at step S16 in FIG. 14 has ended is determined. If the temporary master process period has not ended, the control proceeds to step S36, and if the temporary master process period has ended, the control proceeds to step S40.

At step S40, the transmission of the beacon signal ends.

At step S42, in response to a connection request from a source game device having transmitted a received connection request signal, a response signal is transmitted to the source game device. After the response, the control proceeds to a "master process" in FIG. 18.

Figure 17:
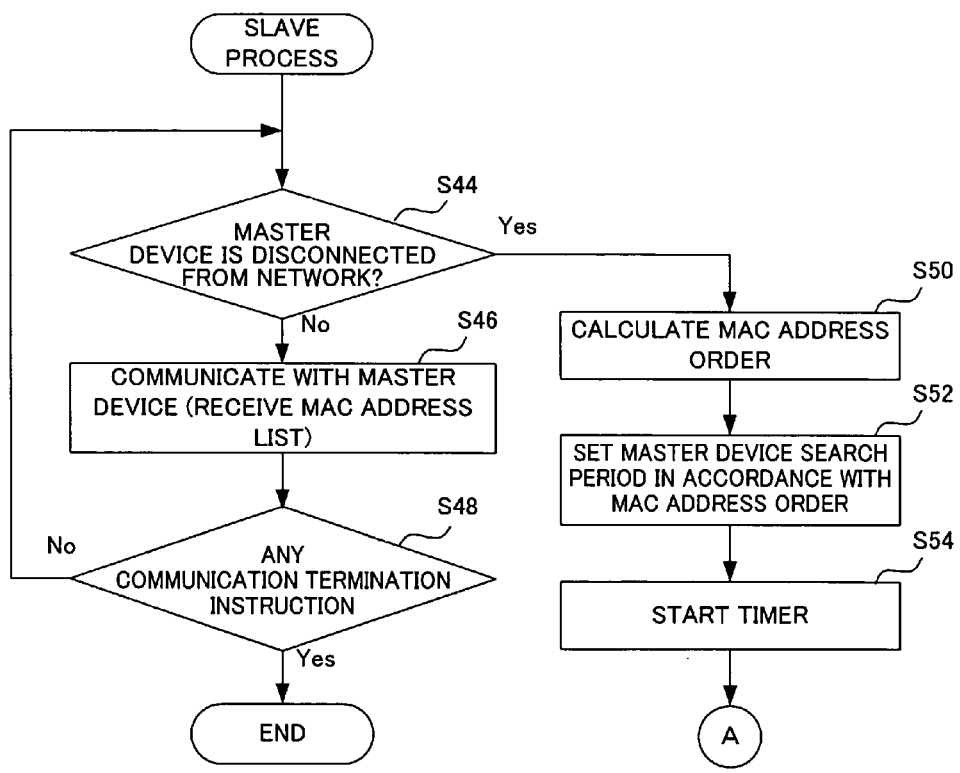
FIG. 17 is a flowchart showing the details of a slave process.

Next, referring to FIG. 17, the details of the slave process are described. The slave process is a process to be executed by a slave device in a network.

At step S44 in FIG. 17, it is determined whether the master device is disconnected from the network. If it is determined that the master device is disconnected from the network, the control proceeds to step S50. If it is determined that the master device is not disconnected from the network, the control proceeds to step S46.

At step S46, communication with the master device is performed. This step includes a process of transferring game data, a process of receiving a MAC address list, and so on. If the MAC address list is received, the MAC address list is stored to the MAC address list storage region 49.

At step S48, it is determined whether a communication termination instruction has been received from the game program or the player. If the communication termination instruction has been given, the wireless communication process performed by the wireless communication program is terminated, and if no communication termination instruction has been given, the control proceeds to step S44.

At step S50, the position of the game device in the order of MAC addresses is calculated based on the MAC address list stored in the MAC address list storage region 49.

At step S52, the master device search period is determined in accordance with the position in the MAC address order calculated at step S50 (e.g., in accordance with the table shown in FIG. 11), and stored to a suitable region in the RAM 24.

At step S54, the timer starts counting. The timer counts a period of time elapsed since the master device is found to be disconnected from the network.

After step S54, the control proceeds to step S20 in FIG. 15, where the initial master device search is executed for the master device search period determined at step S52 in FIG. 17. Further, when the initial master device search is completed, the control proceeds to step S16 in FIG. 14, and thereafter the temporary master process and the master device search are alternately performed for randomly determined periods of time.

Figure 18:
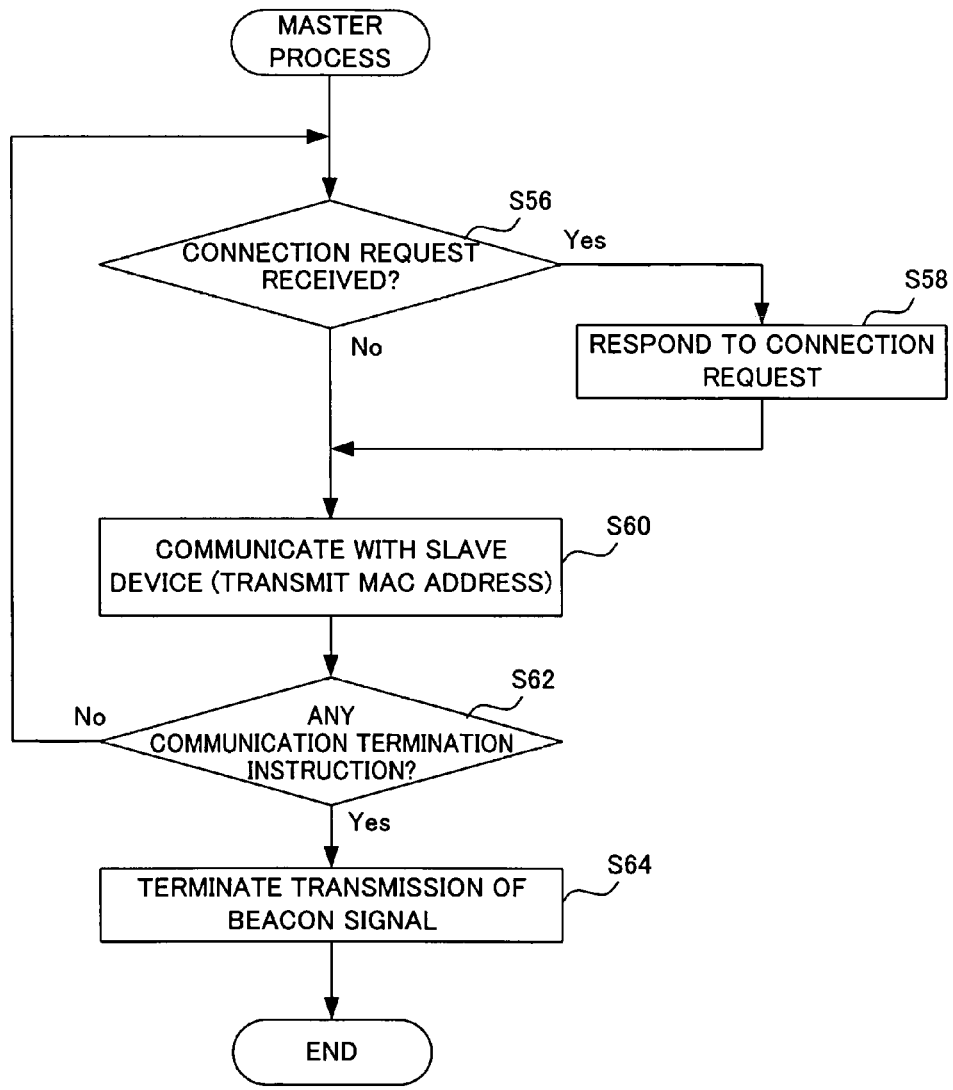
FIG. 18 is a flowchart showing the details of a master process.

Next, referring to FIG. 18, the details of the master process are described. The master process is a process to be executed by a master device in a network.

At step S56 in FIG. 18, it is determined whether any connection request signal has been received from a game device which has not joined the network. If it is determined that any connection request signal has been received, the control proceeds to step S58, and if it is determined that no connection request signal has been received, the control proceeds to step S60.

At step S58, in response to a connection request from a source game device having transmitted a received connection request signal, a response signal is transmitted to the source game device. After the response, the control proceeds to step S60.

At step S60, communication with a slave device is performed. This step includes a process of transferring game data, a process of transmitting a MAC address list, and so on.

At step S62, it is determined whether any communication termination instruction has been received from the game program or the player. If it is determined that any communication termination instruction has been given, the wireless communication performed by the wireless communication program is terminated. If it is determined that no communication termination instruction has been given, the control returns to step S56.

At step S64, the transmission of the beacon signal is terminated, and thereafter the wireless communication process performed by the wireless communication program is terminated.

Note that the process procedure in accordance with the flowcharts of FIGS. 14-18 is merely illustrated for the purpose of carrying out the present invention.

In the present embodiment, both the master device search period and the temporary master process period are randomly set, but the present invention is not limited to this. Either one of the master device search period and the temporary master process period may be randomly set, and the other may be fixed.

Also, the present embodiment has illustrated an example where a wireless network is constructed using game devices. However, the present invention is not limited to this. The present invention is applicable to a case where a wireless network is constructed using arbitrary information processing terminal devices.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A wireless network system comprising a plurality of terminal devices having a radio communication function, one of the plurality of terminal devices acting as a master device for controlling data transfer timing in a network, each terminal device other than the master device acting as a slave device performing data transfer with the master device under the master device's control, wherein each of the plurality of terminal devices includes:
master device search programmed logic circuitry for searching for any terminal device acting as the master device and any terminal device acting as a temporary master device;
temporary master process programmed logic circuitry for causing the terminal device to act as the temporary master device;
switching programmed logic circuitry for, if the terminal device has not joined the network, performing a switching operation for alternately activating the master device search programmed logic circuitry and the temporary master process programmed logic circuitry;
slave process programmed logic circuitry for, if the master device search programmed logic circuitry detects the master device's presence or the temporary master device's presence, causing the terminal device to act as a slave device for the detected master device or temporary master device; and
master process programmed logic circuitry for, if another terminal device is detected as searching for the master device or temporary master device during a period for which the terminal device is caused by the temporary master process programmed logic circuitry to act as the temporary master device, causing the terminal device to act as the master device, wherein each of the plurality of terminal devices further includes master device disconnection determination programmed logic circuitry for, when the terminal device is acting as the slave device, determining whether the master device is disconnected from a network to which the terminal device belongs, and if the master device disconnection determination programmed logic circuitry detects that the master device is disconnected from the network, the switching programmed logic circuitry automatically starts the switching operation, and wherein each of the plurality of terminal devices further includes identification information storage programmed logic circuitry for, when a network is constructed with any other terminal device, receiving and storing identification information for identifying the other terminal device in the network, and the master device search programmed logic circuitry searches for any other terminal device, acting as the master device or acting as the temporary master device and has previously belonged in the network, based on the identification information stored in the identification information storage programmed logic circuitry.

2. The wireless network system according to claim 1, wherein when the switching programmed logic circuitry performs the switching operation for alternately activating the master device search programmed logic circuitry and the temporary master process programmed logic circuitry, the switching programmed logic circuitry randomly sets one or both of a period in which to activate the master device search programmed logic circuitry and a period in which to activate the temporary master process programmed logic circuitry.

3. The wireless network system according to claim 1, wherein
each of the plurality of terminal devices transmits, at regular intervals, a beacon signal including at least information indicating that the terminal device is acting as the master device or as the temporary master device, when the terminal device is acting as the master device or temporary master device respectively, and
the master device search programmed logic circuitry receives a beacon signal transmitted from any other terminal device to detect the master device's presence or the temporary master device's presence.

4. The wireless network system according to claim 1, wherein after a predetermined period of time has elapsed since the master device disconnection determination programmed logic circuitry determined that the master device is disconnected from the network, the master device search programmed logic circuitry searches for, in addition to terminal devices having previously belonged in the network, a terminal device acting as the master device or a terminal device acting as the temporary master device.

5. The wireless network system according to claim 1, wherein the identification information is a MAC address list which lists a MAC address of any other terminal device having previously belonged in the network.

6. The wireless network system according to claim 5, wherein
each of the plurality of terminal devices transmits, at regular intervals, a beacon signal including at least its own MAC signal when acting as the master device or when acting as the temporary master device, and
when any other terminal device's presence has been detected while the other terminal device is acting as the master device or temporary master device, the master device search programmed logic circuitry checks a MAC address of the other terminal device, which is included in the beacon signal transmitted from the other terminal device, with the MAC address list stored in the identification information storage programmed logic circuitry, and determines whether the other terminal device has previously belonged in the network in which the terminal device has previously belonged.

7. A wireless network system comprising a plurality of terminal devices having a radio communication function, one of the plurality of terminal devices acting as a master device for controlling data transfer timing in a network, each terminal device other than the master device acting as a slave device performing data transfer with the master device under the master device's control, wherein
each of the plurality of terminal devices includes:
master device search programmed logic circuitry for searching for any terminal device acting as the master device and any terminal device acting as a temporary master device;
temporary master process programmed logic circuitry for causing the terminal device to act as the temporary master device;
switching programmed logic circuitry for, if the terminal device has not joined the network, performing a switching operation for alternately activating the master device search programmed logic circuitry and the temporary master process programmed logic circuitry;
slave process programmed logic circuitry for, if the master device search programmed logic circuitry detects the master device's presence or the temporary master device's presence, causing the terminal device to act as a slave device for the detected master device or temporary master device; and
master process programmed logic circuitry for, if another terminal device is detected as searching for the master device or temporary master device during a period for which the terminal device is caused by the temporary master process programmed logic circuitry to act as the temporary master device, causing the terminal device to act as the master device, wherein
each of the plurality of terminal devices further includes master device disconnection determination programmed logic circuitry for, when the terminal device is acting as the slave device, determining whether the master device is disconnected from a network to which the terminal device belongs, and if the master device disconnection determination programmed logic circuitry detects that the master device is disconnected from the network, the switching programmed logic circuitry automatically starts the switching operation, wherein
each of the plurality of terminal devices further includes individual number storage programmed logic circuitry for, when a network is constructed with any other terminal device, receiving and storing a list of an individual number of the other terminal device in the network, and
when the master device disconnection determination programmed logic circuitry has determined that the master device is disconnected from the network, the switching programmed logic circuitry compares the individual number list stored in the individual number list with an individual number of the terminal device, and sets, based on a comparison result, an initial period in which to activate the master device search programmed logic circuitry.

8. The wireless network system according to claim 7, wherein the individual number is a MAC address of a terminal device.

9. A non-transitory computer-readable storage medium having stored therein a radio communication program which upon execution of a computer and a terminal device performs a method of constructing a wireless network system comprising a plurality of terminal devices, each terminal device having a radio communication function, one of the plurality of terminal devices acting as a master device for controlling data transfer timing in a network, each terminal device other than the master device acting as a slave device performing data transfer with the master device under control of the master device, the method comprising:
master device search for searching for any other terminal device acting as the master device and any terminal device acting as a temporary master device;
temporary master acting for causing the terminal device to act as the temporary master device;

switching for, if the terminal device has not joined the network, performing a switching operation for alternately activating the master device search and the temporary master acting;

slave process acting for, if the master device search detects the master device's presence or the temporary master device's presence, causing the terminal device to act as a slave device for the detected master device or temporary master device; and master process acting for, if another terminal device is detected as searching for the master device or temporary master device during a period for which the terminal device itself is caused by the temporary master acting to act as the temporary master device, causing the terminal device to act as the master device, wherein the wireless communication program further causes the computer to act master device disconnection determination for, when the terminal device itself is acting as the slave device, determining whether the master device is disconnected from a network in which the terminal device itself belongs, and if the master device disconnection determination detects that the master device is disconnected from the network, the switching automatically starts the switching operation, and wherein the wireless communication program further causes the computer to act identification information storage for, when a network is constructed with any other terminal device, receiving and storing identification information for identifying the other terminal device in the network, and the master device search searches for any other terminal device acting as the master device or acting as the temporary master device and has previously belonged in the network, based on the identification information stored in the identification information storage.

10. The storage medium according to claim 9, wherein when the switching performs the switching operation for alternately activating the master device search and the temporary master acting, the switching randomly sets one or both of a period in which to activate the master device search and a period in which to activate the temporary master acting.

11. The storage medium according to claim 9, wherein each of the plurality of terminal devices transmits, at regular intervals, a beacon signal including at least information indicating that the terminal device is acting as the master device or temporary master device, when the terminal device is acting as the master device or temporary master device respectively, and the master device search receives a beacon signal transmitted from any other terminal device to detect the master device's presence or the temporary master device's presence.

12. The storage medium according to claim 9, wherein after a predetermined period of time has elapsed since the master device disconnection determination determined that the master device is disconnected from the network, the master device search searches for, in addition to terminal devices having previously belonged in the network, a terminal device acting as the master device or temporary master device.

13. The storage medium according to claim 9, wherein the identification information is a MAC address list which lists a MAC address of any other terminal device having previously belonged in the network.

14. The storage medium according to claim 13, wherein each of the plurality of terminal devices transmits, at regular intervals, a beacon signal including at least its own MAC signal when acting as the master device or as the temporary master device, and when any other terminal device's presence has been detected while the other terminal device is acting as the master device or temporary master device, the master device search checks a MAC address of that other terminal device, which is included in the beacon signal transmitted from that other terminal device, with the MAC address list stored in the identification information storage, and determines whether that other terminal device has previously belonged to the network in which the terminal device has previously belonged.

15. A non-transitory computer-readable storage medium having stored therein a radio communication program which upon execution of a computer and a terminal device performs a method of constructing a wireless network system comprising a plurality of terminal devices, each terminal device having a radio communication function, one of the plurality of terminal devices acting as a master device for controlling data transfer timing in a network, each terminal device other than the master device acting as a slave device performing data transfer with the master device under control of the master device, the method comprising master device search for searching for any other terminal device acting as the master device and any terminal device acting as a temporary master device;

temporary master acting for causing the terminal device to act as the temporary master device;

switching for, if the terminal device has not joined the network, performing a switching operation for alternately activating the master device search and the temporary master acting;

slave process acting for, if the master device search detects the master device's presence or the temporary master device's presence, causing the terminal device to act as a slave device for the detected master device or temporary master device; and master process acting for, if another terminal device is detected as searching for the master device or temporary master device during a period for which the terminal device itself is caused by the temporary master acting to act as the temporary master device, causing the terminal device to act as the master device, wherein the wireless communication program further causes the computer to act master device disconnection determination for, when the terminal device itself is acting as the slave device, determining whether the master device is disconnected from a network in which the terminal device itself belongs, and if the master device disconnection determination detects that the master device is disconnected from the network, the switching automatically starts the switching operation, wherein the wireless communication program further causes the computer to act individual number storage for, when a network is constructed with any other terminal device, receiving and storing a list of an individual number of that other terminal device in the network, and when the master device disconnection determination has determined that the master device is disconnected from the network, the switching compares the individual number list stored in the individual number list with an individual number of the terminal device, and sets, based on a comparison result, an initial period in which to activate the master device search.

16. The storage medium system according to claim 15, wherein the individual number is a MAC address of a terminal device.

17. A method of setting up a wireless network system comprising a plurality of terminal devices having a radio communication function, one of the plurality of terminal devices acting as a master device for controlling data transfer timing in a network, each terminal device other than the master device acting as a slave device performing data transfer with the master device under the master device's control, said method comprising the steps of:

for each of the plurality of terminal devices:
searching for any terminal device acting as the master device and any terminal device acting as a temporary master device;
acting as the temporary master device;
alternating, if the terminal device has not joined the network, between the searching step and acting as the temporary master device;
acting, if the searching step detects the master device's presence or the temporary master device's presence, as a slave device for the detected master device or temporary master device; and
acting, if another terminal device is detected as searching for the master device or temporary master device during a period for which the terminal device is acting as the temporary master device, as the master device;
for each of the plurality of terminal devices, determining, when the terminal device is acting as the slave device, whether the master device is disconnected from a network to which the terminal device belongs, and
activating, if the detecting step detects that the master device is disconnected from the network, the alternating step, and further comprising the steps of:
for each of the plurality of terminal devices, receiving, when a network is constructed with any other terminal device, identification information for identifying the other terminal device in the network, and
searching for any other terminal device, acting as the master device or as the temporary master device and has previously belonged in the network, based on the identification information.

18. The method according to claim 17, further comprising during the alternating step, randomly setting one or both of a period in which to activate the searching step and a period in which to act as the temporary master device.

19. The method according to claim 17, further comprising the steps of:
for each of the plurality of terminal devices, transmitting at regular intervals a beacon signal including at least information indicating that the terminal device is acting as the master device or as the temporary master device, when the terminal device is acting as the master device or as temporary master device respectively, and
receiving a beacon signal transmitted from any other terminal device to detect the master device's presence or the temporary master device's presence.

20. The method according to claim 17, further comprising searching, after a predetermined period of time has elapsed since the determining step has determined that the master device is disconnected from the network, for terminal devices having previously belonged in the network and a terminal device acting as the master device or a terminal device acting as the temporary master device.

21. The method according to claim 17, wherein the identification information is a MAC address list which lists a MAC address of any other terminal device having previously belonged in the network.

22. The method according to claim 21, further comprising the steps of:
for each of the plurality of terminal devices, transmitting, at regular intervals, a beacon signal including at least its own MAC signal when acting as the master device or when acting as the temporary master device;
checking, when any other terminal device's presence has been detected while the other terminal device is acting as the master device or as temporary master device, a MAC address of the other terminal device included in the beacon signal transmitted from the other terminal device; and
determining whether the other terminal device has previously belonged in the network in which the terminal device has previously belonged.

23. A method of setting up a wireless network system comprising a plurality of terminal devices having a radio communication function, one of the plurality of terminal devices acting as a master device for controlling data transfer timing in a network, each terminal device other than the master device acting as a slave device performing data transfer with the master device under the master device's control, said method comprising the steps of:

for each of the plurality of terminal devices:
searching for any terminal device acting as the master device and any terminal device acting as a temporary master device;
acting as the temporary master device;
alternating, if the terminal device has not joined the network, between the searching step and acting as the temporary master device;
acting, if the searching step detects the master device's presence or the temporary master device's presence, as a slave device for the detected master device or temporary master device; and
acting, if another terminal device is detected as searching for the master device or temporary master device during a period for which the terminal device is acting as the temporary master device, as the master device, the method further comprising the steps of:
for each of the plurality of terminal devices, determining, when the terminal device is acting as the slave device, whether the master device is disconnected from a network to which the terminal device belongs, and
activating, if the detecting step detects that the master device is disconnected from the network, the alternating step, and further comprising the steps of:
for each of the plurality of terminal devices, receiving, when a network is constructed with any other terminal device, a list of an individual number of the other terminal device in the network, and
comparing during the alternating step, when the determining step determines that the master device is disconnected from the network, the individual number list with an individual number of the terminal device, and setting, based on a comparison result, an initial period in which to activate the searching step.

24. The method according to claim 23, wherein the individual number is a MAC address of a terminal device.

* * * * *